US 8,078,814 B2

(12) United States Patent
Emaru et al.

(10) Patent No.: US 8,078,814 B2
(45) Date of Patent: Dec. 13, 2011

(54) METHOD OF IMPROVING EFFICIENCY OF REPLICATION MONITORING

(75) Inventors: Hironori Emaru, Yokohama (JP); Yuichi Yagawa, Yokohama (JP); Hiroyuki Inoue, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 708 days.

(21) Appl. No.: 11/599,299

(22) Filed: Nov. 15, 2006

(65) Prior Publication Data

US 2008/0059735 A1 Mar. 6, 2008

(30) Foreign Application Priority Data

Sep. 5, 2006 (JP) ................................ 2006-239929

(51) Int. Cl.
*G06F 12/00* (2006.01)
*G06F 13/00* (2006.01)
*G06F 13/28* (2006.01)
*G06F 15/16* (2006.01)
*G06F 7/00* (2006.01)
*G06F 17/00* (2006.01)

(52) U.S. Cl. ........ 711/162; 711/151; 711/156; 709/217; 707/664; 707/692

(58) Field of Classification Search .................. 711/151, 711/156, 162; 709/217; 707/203, 204
See application file for complete search history.

(56) References Cited

U.S. PATENT DOCUMENTS

| | | | |
|---|---|---|---|
| 7,302,541 B2 | 11/2007 | Hirezaki et al. | |
| 7,467,234 B2 | 12/2008 | Ikegaya et al. | |
| 2004/0103254 A1 | 5/2004 | Satoyama et al. | |
| 2004/0122809 A1* | 6/2004 | Clark et al. | 707/3 |
| 2005/0021908 A1* | 1/2005 | Ohno et al. | 711/114 |
| 2005/0081098 A1* | 4/2005 | Demaray et al. | 714/15 |
| 2005/0114467 A1* | 5/2005 | Ikegaya et al. | 709/217 |
| 2005/0138309 A1* | 6/2005 | Hiraiwa et al. | 711/162 |
| 2005/0240634 A1* | 10/2005 | Iwamura et al. | 707/200 |
| 2006/0039351 A1 | 2/2006 | Furuhashi et al. | |
| 2006/0101217 A1 | 5/2006 | Maki et al. | |
| 2006/0107098 A1 | 5/2006 | Maki et al. | |

FOREIGN PATENT DOCUMENTS

| | | |
|---|---|---|
| JP | 2004-145855 | 5/2004 |
| JP | 2005-352644 | 12/2005 |
| JP | 2006-059260 | 3/2006 |
| JP | 2006-127217 | 5/2006 |
| JP | 2006-139477 | 6/2006 |
| JP | 2006-146476 | 6/2006 |

OTHER PUBLICATIONS

Japanese Office Action dated Jan. 6, 2009, and English language translation of the same.

* cited by examiner

*Primary Examiner* — Michael Alsip
(74) *Attorney, Agent, or Firm* — Antonelli, Terry, Stout & Kraus, LLP.

(57) ABSTRACT

Provided is a copy pair monitoring method which is for a storage system having at least one host computer, at least one storage subsystem, and a management computer, the storage subsystem including volumes storing data requested by the host computer to be written, the management computer being accessible to the host computer and the storage subsystem. The copy pair monitoring method is characterized by including the steps of: obtaining every piece of copy pair definition information that is stored in the host computer; removing duplicate copy pair definition information from the whole copy pair definition information obtained; and collecting the copy pair status based on the obtained copy pair definition information from which duplicate copy pair definition information has been removed.

27 Claims, 14 Drawing Sheets

| VOLUME ID | CTG ID | TYPE | COPY PAIR NAME | PARTNER | |
|---|---|---|---|---|---|
| | | | | STORAGE ID | VOLUME ID |
| VOL11 | 1 | PRIMARY | P1 | SUB1 | VOL14 |
| VOL12 | 1 | PRIMARY | P2 | SUB1 | VOL15 |
| ⋮ | ⋮ | ⋮ | ⋮ | ⋮ | ⋮ |

*FIG. 2*

| HOST NAME | CG NAME | COPY PAIR NAME | PRIMARY | | SECONDARY | |
|---|---|---|---|---|---|---|
| | | | STORAGE NAME | VOLUME ID | STORAGE NAME | VOLUME ID |
| Host A | CG.A | P1 | SUB1 | VOL11 | SUB1 | VOL14 |
| | | P2 | SUB1 | VOL12 | SUB1 | VOL15 |
| | | P3 | SUB1 | VOL13 | SUB1 | VOL16 |

*FIG. 4*

| HOST NAME | CG NAME | COPY PAIR NAME | PRIMARY | | SECONDARY | |
|---|---|---|---|---|---|---|
| | | | STORAGE NAME | VOLUME ID | STORAGE NAME | VOLUME ID |
| Host A | CG.B | P1 | SUB1 | VOL11 | SUB1 | VOL14 |
| | | P2 | SUB1 | VOL12 | SUB1 | VOL15 |
| | | P5 | SUB1 | VOL14 | SUB3 | VOL31 |
| | | P6 | SUB1 | VOL15 | SUB3 | VOL32 |
| | | P9 | SUB3 | VOL31 | SUB3 | VOL34 |
| | | P10 | SUB3 | VOL32 | SUB3 | VOL35 |

*FIG. 5*

| HOST NAME | CG NAME | COPY PAIR NAME | PRIMARY | | SECONDARY | |
|---|---|---|---|---|---|---|
| | | | STORAGE NAME | VOLUME ID | STORAGE NAME | VOLUME ID |
| Host B | CG.C | P9 | SUB3 | VOL31 | SUB3 | VOL34 |
| | | P10 | SUB3 | VOL32 | SUB3 | VOL35 |
| | | P11 | SUB3 | VOL33 | SUB3 | VOL36 |
| | | P12 | SUB4 | VOL41 | SUB4 | VOL42 |

*FIG. 6*

| HOST NAME | CG NAME | COPY PAIR NAME | PRIMARY | | SECONDARY | |
|---|---|---|---|---|---|---|
| | | | STORAGE NAME | VOLUME ID | STORAGE NAME | VOLUME ID |
| Host C | CG.D | P2 | SUB1 | VOL12 | SUB1 | VOL15 |
| | | P3 | SUB1 | VOL13 | SUB1 | VOL16 |
| | | P4 | SUB2 | VOL21 | SUB2 | VOL22 |
| | | P6 | SUB1 | VOL15 | SUB3 | VOL32 |
| | | P7 | SUB1 | VOL16 | SUB3 | VOL33 |
| | | P8 | SUB2 | VOL22 | SUB4 | VOL41 |
| | | P10 | SUB3 | VOL32 | SUB3 | VOL35 |
| | | P11 | SUB3 | VOL33 | SUB3 | VOL36 |
| | | P12 | SUB4 | VOL41 | SUB4 | VOL42 |

*FIG. 7*

| HOST NAME | COPY PAIR NAME | PRIMARY | | SECONDARY | |
|---|---|---|---|---|---|
| | | STORAGE NAME | VOLUME ID | STORAGE NAME | VOLUME ID |
| Host A | P1 | SUB1 | VOL11 | SUB1 | VOL14 |
| | P2 | SUB1 | VOL12 | SUB1 | VOL15 |
| | P3 | SUB1 | VOL13 | SUB1 | VOL16 |
| | P5 | SUB1 | VOL14 | SUB3 | VOL31 |
| | P6 | SUB1 | VOL15 | SUB3 | VOL32 |
| | P9 | SUB3 | VOL31 | SUB3 | VOL34 |
| | P10 | SUB3 | VOL32 | SUB3 | VOL35 |
| Host B | P11 | SUB3 | VOL33 | SUB3 | VOL36 |
| | P12 | SUB4 | VOL41 | SUB4 | VOL42 |
| Host C | P4 | SUB2 | VOL21 | SUB2 | VOL22 |
| | P7 | SUB1 | VOL16 | SUB3 | VOL33 |
| | P8 | SUB2 | VOL22 | SUB4 | VOL41 |

| 9100 | 9200 | 9300 | 9400 | 9500 |
|---|---|---|---|---|
| PRIMARY | | SECONDARY | | COPY PAIR STATUS |
| STORAGE NAME | VOLUME ID | STORAGE NAME | VOLUME ID | |
| SUB1 | VOL11 | SUB1 | VOL14 | PAIR |
| SUB1 | VOL12 | SUB1 | VOL15 | PAIR |
| SUB1 | VOL13 | SUB1 | VOL16 | SUSPEND |
| ☐ | ☐ | ☐ | ☐ | ☐ |

1266

|  | PRIMARY | | SECONDARY | | DEFINITION COUNT |
| --- | --- | --- | --- | --- | --- |
| | STORAGE NAME | VOLUME ID | STORAGE NAME | VOLUME ID | |
| | SUB1 | VOL11 | SUB1 | VOL14 | 2 |
| | SUB1 | VOL12 | SUB1 | VOL15 | 3 |
| | SUB1 | VOL13 | SUB1 | VOL16 | 2 |
| | ☐ | ☐ | ☐ | ☐ | ☐ |

*FIG. 15*

| PRIORITY LEVEL | COPY GROUP NAME | HOST NAME |
|---|---|---|
| 1 | CG.01 | Host A |
| 2 | CG.02 | Host A |
| 3 | CG.03 | Host B |
| 4 | CG.04 | Host C |

METHOD OF IMPROVING EFFICIENCY OF REPLICATION MONITORING

CLAIM OF PRIORITY

The present application claims priority from Japanese patent application 2006-239929 filed on Sep. 5, 2006, the content of which is hereby incorporated by reference into this application.

BACKGROUND

This invention relates to a storage system composed of a host computer, a storage subsystem and a management computer and, more specifically, a technique of monitoring copy pairs.

The development of information-oriented society has resulted in the introduction of computer systems everywhere, and the amount of data processed by individual computer systems is growing at an explosive rate. Another result of the advance of information-oriented society is the enhanced importance given to data that is handled by computer systems and data stored in computer systems is demanded to be high in reliability. Data stored in computer systems has to be protected against all kinds of disaster, and it is a responsibility to society to prevent the loss of data stored in computer systems.

Such the computer systems ensure data reliability by storing the same data in multiple volumes. Data outputted from a host computer which executes processing is not only stored in a volume within a storage subsystem that is connected directly to the host computer but also copied to another volume to be duplicated.

Copy between a source volume and a target volume that are in the same storage subsystem is commonly called local copy, whereas copy between a source volume and a target volume that are in different storage subsystems is called remote copy. Local copy and remote copy are employed in computer systems that are required to have high reliability.

Local copy and remote copy are collectively called replication. Replication enables a computer system to continue operating when a failure in one volume renders this volume inoperative with the use of data stored in the other volume.

Two volumes associated with each other by replication, that is, a source volume and a target volume, are called a copy pair. The host computer stores definition information of volumes forming a copy pair to operate the copy pair and obtains information on the status of the copy pair based on the definition information.

For example, US 2005/114467 A discloses techniques which allow a host computer to obtain replication status information of a remote site storage subsystem that is not directly connected to the host computer.

SUMMARY

Monitoring of the copy pair status is important in order for the host computer to check whether replication operation is running properly.

For instance, an application administrator such as a data base management system (DBMS) monitors copy pairs formed from volumes that are used by the application he/she manages. A storage administrator monitors copy pairs constituted of volumes in storage subsystems he/she manages.

It is common in this case that some copy pairs are monitored by the application administrator and the storage administrator both. Accordingly, monitoring one storage system separately by an application administrator and a storage administrator results in an unnecessary workload on storage subsystems.

There are two types of copy pair monitoring method, one in which information of every copy pair in a storage subsystem is obtained and one in which copy pair information is obtained according to copy pair definitions stored in the host computer or the like.

The former monitoring method puts unnecessary workload on storage subsystems since information of every copy pair in a storage subsystem is collected even when only a limited count of copy pairs need monitoring.

This invention has been made in view of the above, and it is therefore an object of this invention to avoid an overlap in monitoring of copy pairs that are monitored by various administrators from different points of view.

According to a representative aspect of this invention, there is provided a storage system including: at least one host computer having a first processor for performing processing, a first memory unit, which is connected to the first processor, a first interface connected to the first processor, and a first interface connected to the first processor; at least one storage subsystem having a second processor for performing processing, a disk device, which contains volumes storing data requested by the host computer to be written, and a second interface connected to the second processor; and a management computer having a third processor for performing processing, a third memory unit connected to the third processor, and a third interface connected to the third processor. The storage system being characterized in that: a primary volume from which data is copied (i.e., a source volume) and a secondary volume to which data is copied (i.e., a target volume) create a copy pair; the first memory unit of each host computer stores definition information of the copy pair which indicates an association between the primary volume and the secondary volume creating the copy pair; and the third processor obtains every piece of copy pair definition information stored in the first memory unit, removes duplicate copy pair definition information from the whole copy pair definition information obtained from the first memory unit, collects the copy pair status based on the copy pair definition information from which the duplication copy pair definition information has been removed.

According to an aspect of this invention, an overlap in monitoring of copy pairs is avoided and the monitoring workload on a storage system is thus lessened.

BRIEF DESCRIPTION OF THE DRAWINGS

The present invention can be appreciated by the description which follows in conjunction with the following figures, wherein:

FIG. 2 is a diagram showing the configuration of a copy pair definition table which is stored in a local disk in a storage subsystem according to the first embodiment of this invention;

FIG. 4 is a diagram showing the configuration of a copy group definition table that is stored in a host computer A according to the first embodiment of this invention;

FIG. 5 is a diagram showing the configuration of another copy group definition table that is stored in a host computer A according to the first embodiment of this invention;

FIG. 6 is a diagram showing the configuration of a copy group definition table that is stored in a host computer B according to the first embodiment of this invention;

FIG. 7 is a diagram showing the configuration of a copy group definition table that is stored in a host computer C according to the first embodiment of this invention;

FIG. 8 is a diagram showing the configuration of an information obtaining definition table which is created in a memory in a management computer according to the first embodiment of this invention;

FIG. 15 is a diagram showing the configuration of a definition count table according to a second embodiment of this invention;

DETAILED DESCRIPTION OF THE PREFERRED EMBODIMENTS

First Embodiment

A first embodiment of this invention will be described with reference to FIG. 1 to FIG. 14. It should be noted that this invention is not limited to the first and other embodiments described below.

Figure 1:
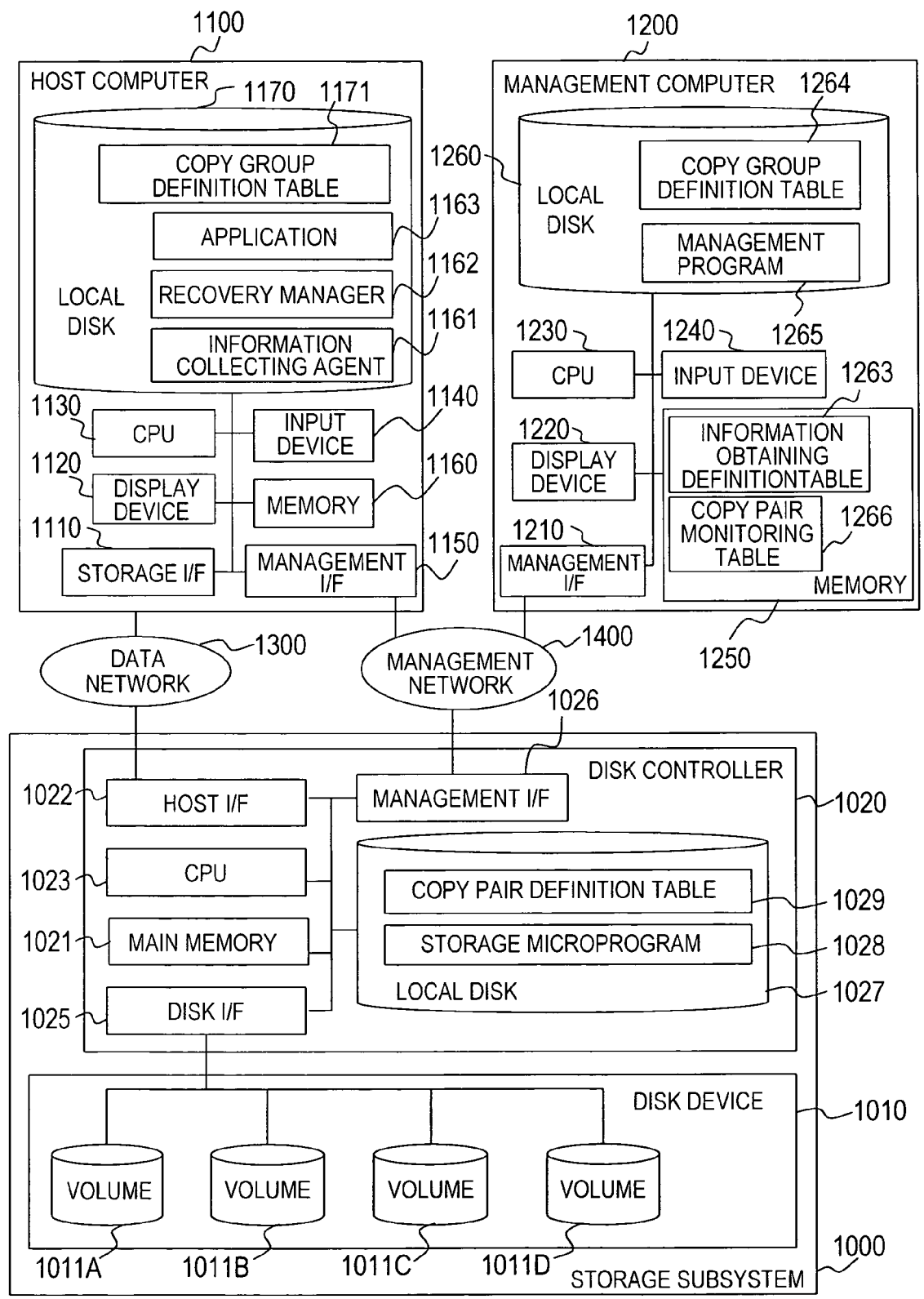
FIG. 1 is a block diagram showing the configuration of a storage system according to a first embodiment of this invention.

FIG. 1 is a block diagram showing the configuration of a storage system according to the first embodiment of this invention.

This storage system has a storage subsystem 1000, a host computer 1100, and a management computer 1200.

The storage subsystem 1000 and the host computer 1100 are interconnected via a data network 1300. The data network 1300 is a network for data communications, in this embodiment, a storage area network (SAN). The data network 1300 can be other data communication networks than SANs, for example, an IP network.

The storage subsystem 1000 and the host computer 1100 are connected to the management computer 1200 via a management network 1400. The management network 1400 is a network for data communications, in this embodiment, an IP network. The management network 1400 can be other data communication networks than IP networks, for example, a storage area network (SAN).

The data network 1300 and the management network 1400 may be one same network. One computer may serve as the management computer 1200 and the host computer 1100 both.

FIG. 1 shows one storage subsystem 1000, one host computer 1100, and one management computer 1200 for convenience of explanation, but the storage system can have more than one storage subsystem 1000, host computer 1100, and management computer 1200.

The storage subsystem 1000 has a disk device 1010 and a disk controller 1020. The disk device 1010 stores data requested by the host computer 1100 to be written. The disk controller 1020 controls processing of the storage subsystem 1000.

The disk device 1010 has plural volumes, here, volumes 1011A, 1011B, 1011C, and 1011D. The volumes 1011A, 1011B, 1011C, and 1011D in the disk device 1010 are collectively and generically referred to as volume 1011.

The volumes 1011 in this invention are not limited to a particular volume type and can be a hard disk drive (HDD), which is a physical storage area, or a logical device, which is a logical storage area. For convenience of explanation, FIG. 1 shows four volumes 1011 but the storage system can have as many volumes 1011 as necessary.

The volumes 1011 can form copy pairs. A copy pair includes one source volume 1011 and one target volume 1011 which stores a copy of data stored in the source volume 1011.

The disk controller 1020 has a host I/F 1022, a management I/F 1026, a disk I/F 1025, a main memory 1021, a CPU 1023, and a local disk 1027.

The local disk 1027 is a disk device such as a hard disk that is connected to the disk controller 1020. The local disk 1027 stores a storage microprogram 1028 and a copy pair definition table 1029.

The local disk 1027 may instead be a flash memory connected to the disk controller 1020.

The storage microprogram 1028 is loaded onto the main memory 1021 of the disk controller 1020 and executed by the CPU 1023. The storage microprogram 1028 controls copy pairs and collects the copy pair status as requested by the host computer 1100.

Copy pair control exerted by the storage microprogram 1028 includes, for example, "create", "synchronization", and "suspend". In "create", the storage microprogram 1028 creates a new copy pair. In "synchronization", the primary volume 1011 and the secondary volume 1011 are in sync with each other and data in the primary volume 1011 matches data in the secondary volume 1011. In "suspend", the synchronization between the primary volume 1011 and the secondary volume 1011 is suspended. "Create", "synchronization" and "suspend" are terms used to indicate the status of a copy pair formed from the volumes 1011, and the copy pair status is fetched by the storage microprogram 1028.

The copy pair definition table 1029 stores information on some of the volumes 1011 in the storage subsystem 1000 that form copy pairs. Details of the copy pair definition table 1029 will be described with reference to FIG. 2.

The storage microprogram 1028 and the copy pair definition table 1029 are stored in the local disk 1027 of the disk controller 1020 in this embodiment, but this invention is not limited thereto. The storage microprogram 1028 and the copy pair definition table 1029 may be stored in, for example, a flash memory connected to the disk controller 1020, or the volumes 1011 in the disk device 1010.

The host I/F 1022 is a network interface that connects the storage subsystem 1000 to the data network 1300. The host I/F 1022 exchanges data and control commands with the host computer 1100 through the data network 1300.

The management I/F 1026 is a network interface that connects the storage subsystem 1000 to the management network 1400. The management I/F 1026 exchanges data and control commands with the host computer 1100 and with the management computer 1200 through the management network 1400.

The disk I/F 1025 is an interface that connects the disk controller 1020 to the disk device 1010.

The host computer 1100 has a storage I/F 1110, a display device 1120, a CPU 1130, an input device 1140 such as a keyboard and a mouse, a management I/F 1150, a memory 1160, and a local disk 1170. The storage I/F 1110, the display device 1120, the CPU 1130, the input device 1140, the management I/F 1150, the memory 1160, and the local disk 1170 are connected to one another.

The storage I/F 1110 is a network interface that connects the host computer 1100 to the data network 1300. The storage I/F 1110 exchanges data and control commands with the storage subsystem 1000 through the data network 1300.

The management I/F 1150 is a network interface that connects the host computer 1100 to the management network 1400. The management I/F 1150 exchanges data and control commands with the storage subsystem 1000 and with the management computer 1200 through the management network 1400.

The local disk 1170 is a disk device such as a hard disk. The local disk 1170 stores an information collecting agent 1161, a recovery manager 1162, an application 1163, and a copy group definition table 1171.

The copy group definition table 1171 shows information that defines a copy group obtained by grouping plural copy pairs together. The copy group will be described in detail with reference to FIG. 3.

One of reasons for defining copy group information in the host computer 1100 is security. In the case where plural corporations or the like use the storage subsystem 1000 in one storage system (of, for example, an SSP: Storage Service Provider) and each corporation is allocated particular volumes 1011, the storage system unnecessarily collects information of copy pairs constituted of volumes that are used by other corporations when only copy pairs formed from the respectively allocated volumes 1011 need to be monitored. This poses a security problem.

It is therefore a common practice to define copy pair definition information in the host computer 1100, so that definition information of a copy pair to be monitored is retrieved from the host computer 1100 having this definition information and information on the copy pair is obtained based on the retrieved definition information. In this case, when there is a change in copy pair configuration, definition information is retrieved from the host computer 1100 and copy pairs are monitored periodically based on the retrieved definition information. A copy pair configuration change is, for example, an addition of a copy pair or a removal of a copy pair.

The information collecting agent 1161, the recovery manager 1162, and the application 1163 are loaded onto the memory 1160 in the host computer 1100, and executed by the CPU 1130.

The application 1163 reads and writes data in the volumes 1011 in the storage subsystem 1000. The application 1163 is, for example, a data base management system (DBMS) or a file system.

The recovery manager 1162 sends a request to the storage microprogram 1028 to control a copy pair or to collect the copy pair status. The function of the recovery manager 1162 to send requests to the storage microprogram 1028 to control a copy pair and to collect the copy pair status is provided by a command line interface, an application programming interface, or the like in order to allow an administrator or another program to execute the function.

The information collecting agent 1161 sends, in response to a request made by a management program 1265, which is stored in the management computer 1200, information in the copy group definition table 1171 stored in the local disk 1170 to the management program 1265.

FIG. 1 shows one application 1163 for convenience of explanation, but the local disk 1170 in this embodiment can store more than one application 1163.

The management computer 1200 has a management I/F 1210, a display device 1220, a CPU 1230, an input device 1240 such as a keyboard and a mouse, a memory 1250, and a local disk 1260. The management I/F 1210, the display device 1220, the CPU 1230, the input device 1240, the memory 1250, and the local disk 1260 are connected to one another.

The management I/F 1210 is a network interface that connects the management computer 1200 to the management network 1400. The management I/F 1210 exchanges data and control commands with the storage subsystem 1000 and with the host computer 1100 through the management network 1400 in order to manage the storage subsystem 1000.

The local disk 1260 is a disk device such as a hard disk connected to the management computer 1200. The local disk 1260 stores a copy group definition table 1264 and the management program 1265.

The copy group definition table 1264 is obtained from the host computer 1100 and is the same as the copy group definition table 1171 stored in the host computer 1100. The copy group definition table 1264 may be stored in the memory 1250 of the management computer 1200 instead of the local disk 1260.

The management program 1265 is loaded onto the memory 1250 in the management computer 1200, and executed by the CPU 1230.

The management program 1265 obtains the copy group definition table 1171 from the host computer 1100. The management program 1265 has a function of creating an information obtaining definition table 1263, a function of creating a copy group monitoring table 1266, and a function of displaying the status of a copy pair.

With the function of creating the information obtaining definition table 1263, the management program 1265 creates the information obtaining definition table 1263 in the memory 1250 from definition information of copy pairs that belong to a copy group registered in the obtained copy group definition table 1171. With the function of creating the copy group monitoring table 1266, the management program 1265 creates the copy pair monitoring table 1266 in the memory 1250 based on the created information obtaining definition table 1263. With the function of displaying the status of a copy pair, the management program 1265 makes a graphical user interface (GUI) display the copy pair status to the administrator based on the created copy pair monitoring table 1266.

The memory 1250 stores the information obtaining definition table 1263 and the copy pair monitoring table 1266.

The information obtaining definition table 1263 registers definition information of copy pairs that do not overlap and are registered in the copy group definition table 1264. Details of the information obtaining definition table 1263 will be described with reference to FIG. 8. The management program 1265 fetches the status of a copy pair whose definition information is found in the information obtaining definition table 1263.

The copy pair monitoring table 1266 registers the copy pair status collected by the management program 1265. Details of the copy pair monitoring table 1266 will be described with reference to FIG. 9.

FIG. 2 is a diagram showing the configuration of the copy pair definition table 1029 which is stored in the local disk 1027 in the storage subsystem 1000 according to the first embodiment of this invention.

The copy pair definition table 1029 shows definition information of some of the volumes 1011 in the storage subsystem 1000 that form copy pairs. A copy pair includes one primary volume 1011 which is a source volume and one secondary volume 1011 which is a target volume 1011, and data stored in the primary volume 1011 is copied to the secondary volume 1011.

The copy pair definition table 1029 contains, in each row, a volume ID 2110, a consistency group (CTG) ID 2120, a type 2130, a copy pair name 2140, a paired storage ID 2150, and a paired volume ID 2160.

Registered as the volume ID 2110 is an identifier that is assigned to each volume 1011 in the storage subsystem 1000. The identifier of each volume 1011 is unique throughout the storage subsystem 1000 where that particular volume 1011 is located.

Registered as the CTG ID 2120 is an identifier unique to each copy pair group in which data consistency has to be maintained. The storage subsystem 1000 assigns the same consistency group identifier to copy pairs that are not allowed to lose consistency through operation as members of the same group.

In this way, when, for instance, a request to operate a copy pair belonging to a certain consistency group is sent from the host computer 1100 to the storage subsystem 1000, all other copy pairs included in this consistency group receive the same operation along with the copy pair that is designated by the received request. When a copy pair does not need to maintain consistency with other copy pairs, nothing is registered as the CTG ID 2120.

A copy group is similar to a consistency group in that copy pairs are grouped together. However, copy pairs are grouped into a copy group by a unit that is specified by the administrator (for example, on a service application basis, or on an operation basis such as a backup operation basis).

On the other hand, copy pairs are grouped into a consistency group in order for the storage subsystem 1000 to operate copy pairs while maintaining the consistency among the copy pairs.

Consistency groups are created in the disk controller 1020 with the use of definition information registered in the copy group definition table 1171, which is stored in the host computer 1100, when the administrator defines the copy group definition table 1171. Alternatively, the creation of consistency groups may not be related to the defining of the copy group definition table 1171.

Registered as the type 2130 is information that indicates whether the volume 1011 identified by the registered volume ID 2110 is the primary volume 1011 or the secondary volume 1011.

Registered as the copy pair name 2140 is a name that is assigned to each copy pair. A copy pair is uniquely identified from the primary volume 1011, the storage subsystem 1000 that has this primary volume 1011, the secondary volume 1011 that constitutes this copy pair, and the storage subsystem 1000 that has this secondary volume 1011. However, it is difficult for an administrator to manage a copy pair by its primary and secondary volumes 1011 and the storage subsystem 1000 having the primary and secondary volumes 1011. It is therefore common for an administrator to assign a name to a copy pair and manage the copy pair by the assigned name.

In the case where the administrator manages copy pairs using the copy group definition table 1171, which is stored in the host computer 1100, there is no need for the administrator to refer to the copy pair definition table 1029 stored in the storage subsystem 1000 himself/herself. Then, copy pairs are not assigned names and the copy pair definition table 1029 does not contain the copy pair name 2140.

Registered as the paired storage ID 2150 is an identifier unique to the storage subsystem 1000 having the volume 1011 that is identified by the registered paired volume ID 2160.

Registered as the paired volume ID 2160 is an identifier unique to the volume 1011 that forms a copy pair with the volume 1011 identified by the registered volume ID 2110.

Rows 2210 and 2220 of the copy pair definition table 1029 show copy pair definitions. In the case where the volume 1011 that is identified by the registered volume ID 2110 has plural paired volumes 1011, in other words, when one volume 1011 is paired with plural volumes 1011 forming plural copy pairs, definitions of the copy pairs constituted of the one volume 1011 are registered in plural rows of the copy pair definition table 1029.

Figure 3:
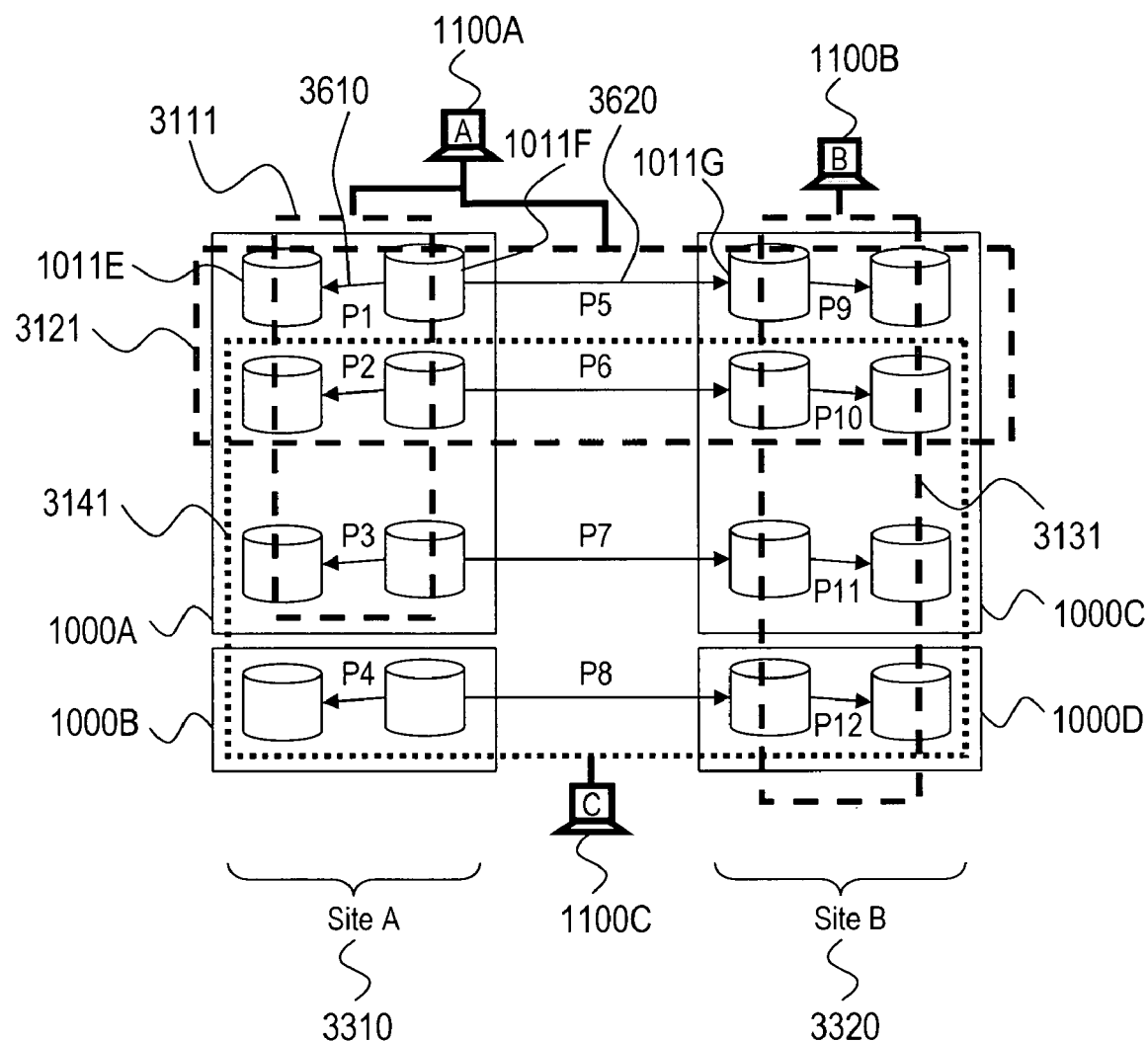
FIG. 3 is a diagram showing the relation of copy groups which are managed by host computers according to the first embodiment of this invention.

FIG. 3 is a diagram showing the relation of copy pairs which are managed by the host computer 1100 according to the first embodiment of this invention.

The storage system shown in FIG. 3 has a two data center configuration which places data centers Site A 3310 and Site B 3320 in different sites. At least one storage subsystem 1000 is installed in each of the data centers.

For instance, if a normal business operation or service is to be carried out in New York while data of the business operation is to be kept in New York and California, a data center has to be placed in New York and California each.

In the data center Site A 3310, a storage subsystem 1000A (hereinafter referred to as SUB1) and a storage subsystem 1000B (hereinafter referred to as SUB2) are installed. Set in the data center Site B 3320 are a storage subsystem 1000C (hereinafter referred to as SUB3) and a storage subsystem 1000D (hereinafter referred to as SUB4).

The SUB1, SUB2, SUB3, and SUB4 have the volumes 1011. For example, the SUB1 has a volume 1011E and a volume 1011F whereas the SUB3 has a volume 1011G.

The volumes 1011 can form copy pairs. For instance, the volume 1011F in the SUB1 and the volume 1011E in the SUB1 form a copy pair P1. The volume 1101F in the SUB1 and the volume 1011G in the SUB3 form a copy pair P5.

When a copy pair is formed from two volumes 1011 that are in the same storage subsystem 1000, data copy between these volumes 1011 forming the copy pair is called local copy. In the example of FIG. 3, copy pairs between which local copy is executed are the copy pair P1, a copy pair P2, a copy pair P3, a copy pair P4, a copy pair P9, a copy pair P10, a copy pair P11, and a copy pair P12.

When a copy pair is formed from two volumes 1011 that are in different storage subsystems 1000, data copy between these volumes 1011 forming the copy pair is called remote copy. In the example of FIG. 3, copy pairs between which remote copy is executed are the copy pair P5, a copy pair P6, a copy pair P7, and a copy pair P8.

Copy pairs are grouped into groups by, for example, service type in order to make them easier for the administrator to manage. Copy pairs grouped together because of having the same service type belong to the same copy group.

In FIG. 3, a host computer 1100A manages a copy group A 3111 and a copy group B 3121. A host computer 1100B manages a copy group C 3131. A host computer 1100C manages a copy group D 3141.

The copy group A 3111 is constituted of the copy pair P1, the copy pair P2, and the copy pair P3. The copy group B 3121 is constituted of the copy pair P1, the copy pair P2, the copy pair P5, the copy pair P6, the copy pair P9, and the copy pair P10. The copy group C 3131 is constituted of the copy pair P9, the copy pair P10, the copy pair P11, and the copy pair P12. The copy group D 3141 is constituted of the copy pair P2, the copy pair P3, the copy pair P4, the copy pair P6, the copy pair P7, the copy pair P8, the copy pair P10, the copy pair P11, and the copy pair P12.

Each host computer 1100 stores for each copy group the copy group definition table 1171 which is definition information of copy pairs belonging to a copy group it manages.

Described next with reference to FIG. 4 to FIG. 7 are the copy group definition tables 1171 respectively stored in the host computer 1100A, the host computer 1100B, and the host computer 1100C in FIG. 3. The copy group definition tables 1171 shown in FIG. 4 to FIG. 7 have the same configuration, and the following description therefore takes the copy group definition table 1171 of FIG. 4 as an example.

FIG. 4 is a diagram showing the configuration of the copy group definition table 1171 that is stored in the host computer 1100A according to the first embodiment of this invention.

The copy group definition table 1171 contains, in each row, a host computer name 4110, a copy group name 4120, a copy pair name 4130, a primary storage subsystem name 4140, a primary volume ID 4150, a secondary storage subsystem name 4160 and a secondary volume ID 4170.

Registered as the host computer name 4110 is the name of the host computer 1100 that stores the copy group definition table 1171.

The name of a copy group is registered as the copy group name 4120. Registered as the copy pair name 4130 is the name of a copy pair belonging to the copy group that is identified by the registered copy group name 4120. The copy pair name 4130 may be omitted since each copy pair is uniquely identified from the primary storage subsystem name 4140, the primary volume ID 4150, the secondary storage subsystem name 4160, and the secondary volume ID 4170. The copy pair name 4130 is contained in the copy group definition table 1171 commonly because it facilitates copy pair management for the administrator.

Registered as the primary storage subsystem name 4140 is the name of the storage subsystem 1000 having the volume 1011 that serves as the primary volume of the copy pair. Registered as the primary volume ID 4150 is the identifier of the volume 1011 that serves as the primary volume of the copy pair. Each volume 1011 is assigned an identifier unique throughout the storage subsystem 1000 that has the volume 1011 in question.

Registered as the secondary storage subsystem name 4160 is the name of the storage subsystem 1000 having the volume 1011 that serves as the secondary volume of the copy pair. Registered as the secondary volume ID 4170 is the identifier of the volume 1011 that serves as the secondary volume of the copy pair. Each volume 1011 is assigned an identifier unique throughout the storage subsystem 1000 that has the volume 1011 in question.

A row 4210 in the copy group definition table 1171 holds information that defines the copy pair P1 shown in FIG. 3, a row 4220 holds information that defines the copy pair P2 shown in FIG. 3, and a row 4230 holds information that defines the copy pair P3 shown in FIG. 3.

The copy group definition table 1171 of FIG. 4 defines that the host computer 1100A manages the copy group A 3111 constituted of the copy pair P1, the copy pair P2, and the copy pair P3.

The copy group definition table 1171 that is shown in FIG. 5 and stored in the host computer 1100A defines that the host computer 1100A manages the copy group B 3121 constituted of the copy pair P1, the copy pair P2, the copy pair P5, the copy pair P6, the copy pair P9, and the copy pair P10.

The copy group definition table 1171 that is shown in FIG. 6 and stored in the host computer 1100B defines that the host computer 1100B manages the copy group C 3131 constituted of the copy pair P9, the copy pair P10, the copy pair P11, and the copy pair P12.

The copy group definition table 1171 that is shown in FIG. 7 and stored in the host computer 1100C defines that the host computer 1100C manages the copy group D 3141 constituted of the copy pair P2, the copy pair P3, the copy pair P4, the copy pair P6, the copy pair P7, the copy pair P8, the copy pair P10, the copy pair P11, and the copy pair P12.

In this embodiment, definition information of one copy group is registered in one copy group definition table 1171. Alternatively, one copy group definition table 1171 may register definition information of copy pairs in all copy groups that are managed by the host computer 1100 that stores this copy group definition table 1171.

FIG. 8 is a diagram showing the configuration of the information obtaining definition table 1263, which is created in the memory 1250 of the management computer 1200 according to the first embodiment of this invention.

Figure 13:
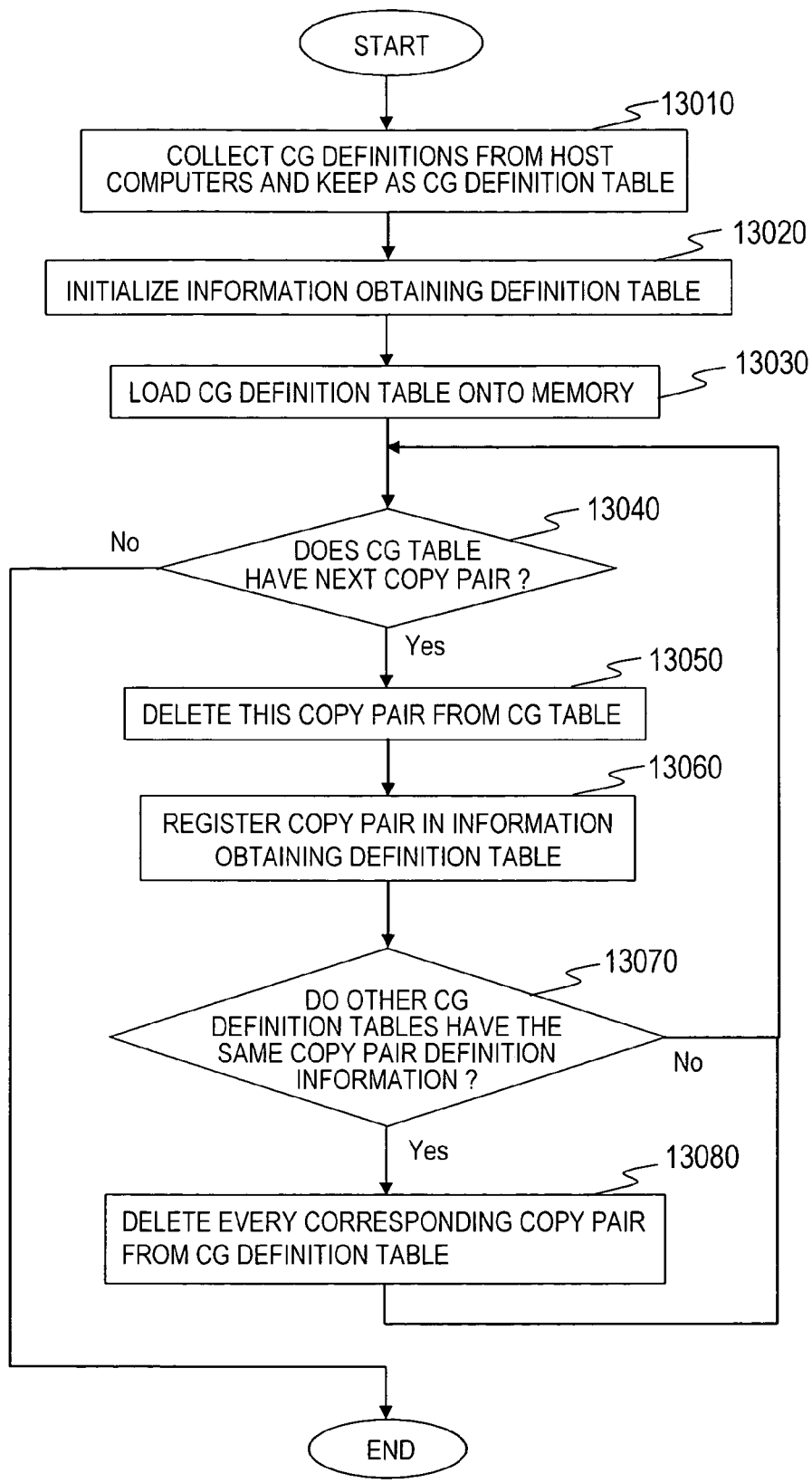
FIG. 13 is a flow chart for processing that is executed by a management program according to the first embodiment of this invention to create the information obtaining definition table.

The management program 1265 executes operation sequence shown in FIG. 13 to create the information obtaining definition table 1263, and thereby deletes overlapping copy pairs from the copy group definition tables 1264 obtained from the respective host computers 1100. The management program 1265 thus creates the information obtaining definition table 1263 in the memory 1250 of the management computer 1200. When the management computer 1200 sends a request to collect the copy pair status to the host computers 1100, it is the status of copy pairs defined in the information obtaining definition table 1263 that is requested to be collected.

The information obtaining definition table 1263 contains, in each row, a host computer name 8110, a copy pair name 8120, a primary storage subsystem name 8130, a primary volume ID 8140, a secondary storage subsystem name 8150, and a secondary volume ID 8160.

Registered as the host computer name 8110 is the name of the host computer 1100 that sends to the storage subsystem 1000 a request to fetch the status of a copy pair identified by the registered copy pair name 8120.

The copy pair name 8120, the primary storage subsystem name 8130, the primary volume ID 8140, the secondary storage subsystem name 8150, and the secondary volume ID 8160 indicate the same names or IDs as in the copy group definition table 1171, and their descriptions will therefore be omitted.

Figures 9, 10:
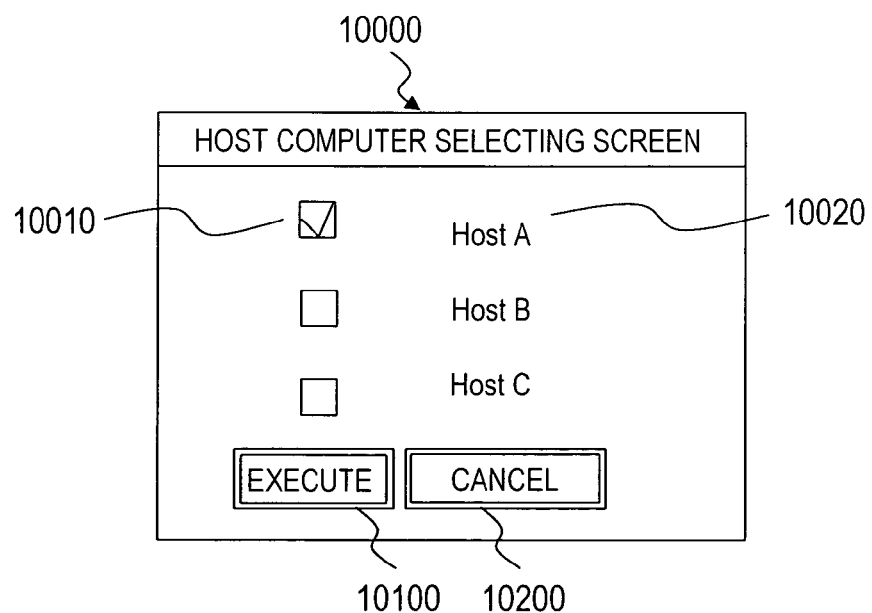
FIG. 9 is a diagram showing the configuration of a copy pair monitoring table which is created in the memory in the management computer according to the first embodiment of this invention.
FIG. 10 is a diagram illustrating a host computer selecting screen according to the first embodiment of this invention.

FIG. 9 is a diagram showing the configuration of the copy pair monitoring table 1266, which is created in the memory 1250 of the management computer 1200 according to the first embodiment of this invention.

Figure 14:
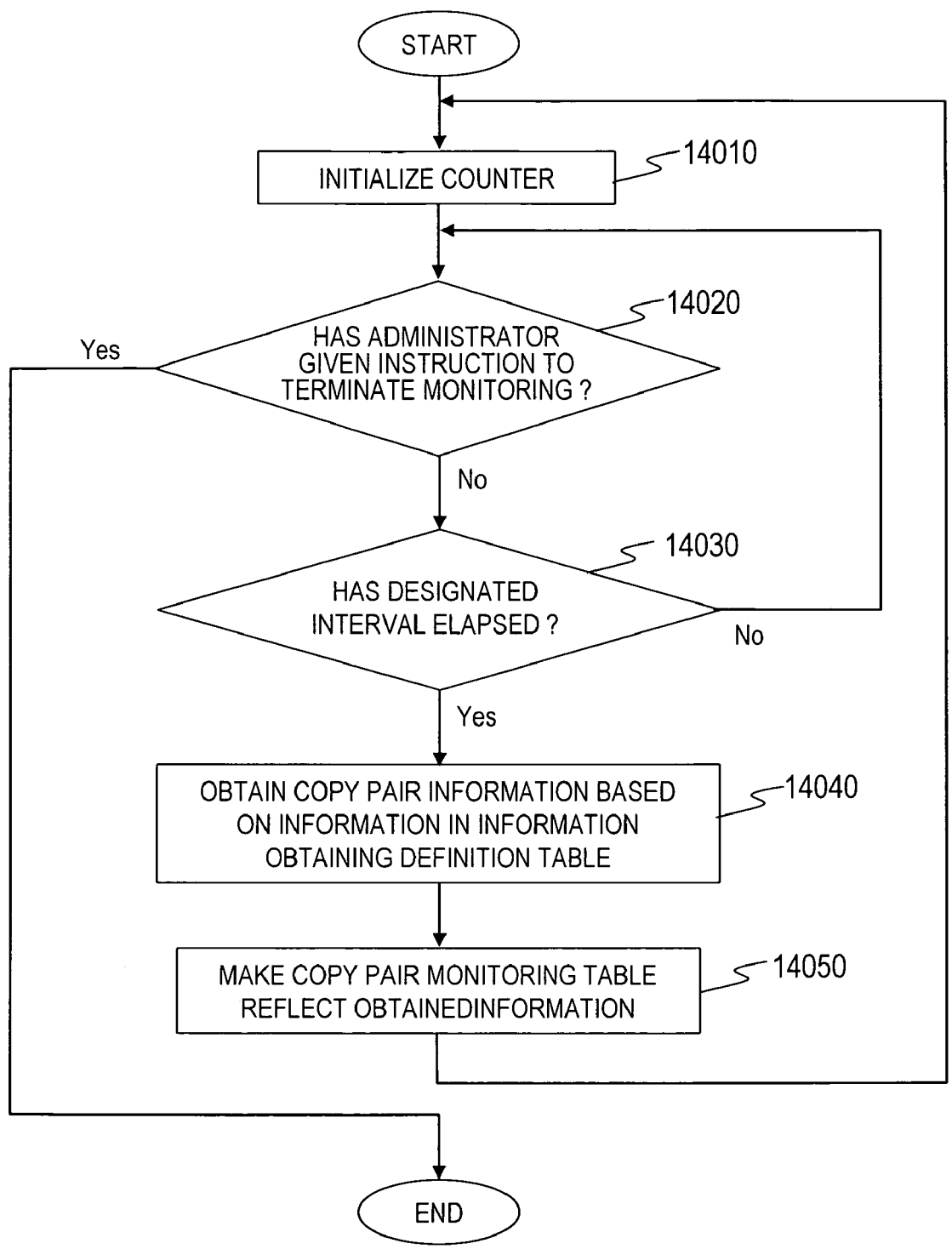
FIG. 14 is a flow chart for processing that is executed by the management program according to the first embodiment of this invention to create the copy pair monitoring table.

The management program 1265 executes processing shown in FIG. 14 to create the copy pair monitoring table 1266, and thereby creates the copy pair monitoring table 1266 in the memory 1250 of the management computer 1200.

The copy pair monitoring table 1266 contains, in each row, a primary storage subsystem name 9100, a primary volume ID 9200, a secondary storage subsystem name 9300, a secondary volume ID 9400, and copy pair status 9500.

The primary storage subsystem name 9100, the primary volume ID 9200, the secondary storage subsystem name 9300, and the secondary volume ID 9400 indicate the same names or IDs as in the copy group definition table 1171, and their descriptions will therefore be omitted.

Registered as the copy pair status 9500 is the status of a copy pair that is uniquely identified from the primary storage subsystem name 9100, the primary volume ID 9200, the secondary storage subsystem name 9300, and the secondary volume ID 9400. For example, "PAIR", "SUSPEND", or the like is registered as the copy pair status 9500. "PAIR" indicates that the primary volume 1011 and the secondary volume 1011 are in sync with each other, and that data in the primary volume 1011 matches data in the secondary volume 1011. "SUSPEND" indicates that the synchronization between the primary volume 1011 and the secondary volume 1011 is in a suspended state.

The copy pair monitoring table 1266 in this embodiment contains the copy pair status 9500, but may hold other kinds of information such as the data matching ratio of volumes forming a copy pair.

Next, a description will be given with reference to FIG. 10 to FIG. 12 on management screens used by the administrator to monitor copy pairs.

FIG. 10 is a diagram illustrating a host computer selecting screen 10000 according to the first embodiment of this invention.

The host computer selecting screen 10000 is displayed on the display device 1220 of the management computer 1200 when the management program 1265 in the management computer 1200 is loaded onto the memory 1250 and executed by the CPU 1230.

The host computer selecting screen 10000 contains checkboxes 10010, host computer name fields 10020, an "execute" button (i.e., OK button) 10100 and a cancel button 10200.

The host computer selecting screen 10000 shows as many checkboxes 10010 and host computer name fields 10020 as the number of host computers 1100 registered in the copy group definition table 1264 by the host name 4110.

When the host computer selecting screen 10000 is first displayed on the display device 1220, none of the checkboxes 10010 is checked. The administrator can check one or more checkboxes 10010.

The "execute" button 10100 is enabled when the administrator checks one or more checkboxes 10010. When enabled, the "execute" button can be selected, by the administrator. As the "execute" button is operated, a copy group selecting screen 11000 shown in FIG. 11 is displayed.

The cancel button 10200 is operated to close the host computer selecting screen 10000.

Figure 11:
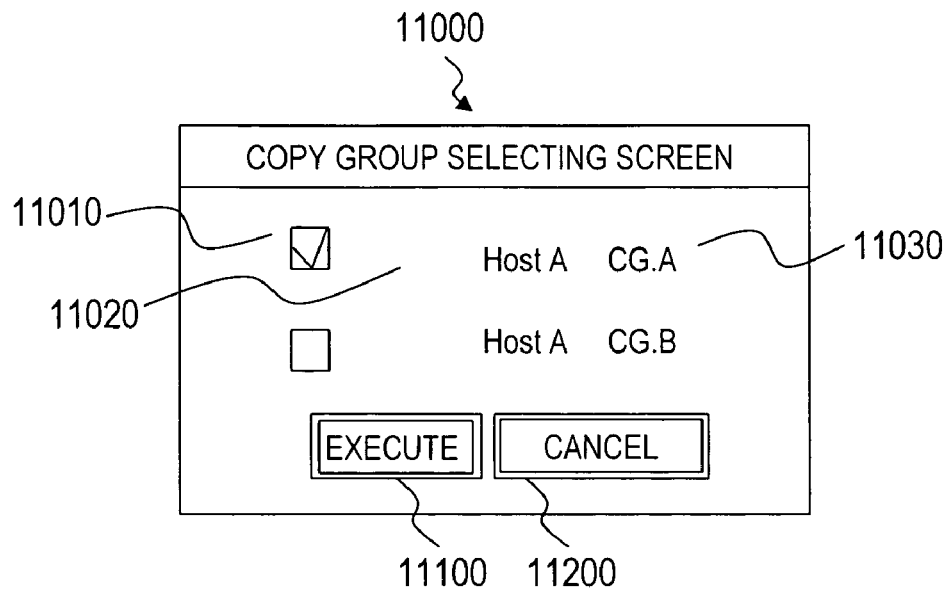
FIG. 11 is a diagram illustrating a copy group selecting screen according to the first embodiment of this invention.

FIG. 11 is a diagram illustrating the copy group selecting screen 11000 according to the first embodiment of this invention.

The copy group selecting screen 11000 is displayed on the display device 1220 when the management program 1265 stored in the management computer 1200 is loaded onto the memory 1250 and executed by the CPU 1230.

The copy group selecting screen 11000 contains checkboxes 11010, host computer name fields 11020, copy group name fields 11030, an "execute" button (i.e., OK button) 11100, and a cancel button 11200.

The copy group selecting screen 11000 shows as many checkboxes 11010, host computer name fields 11020, and copy group name fields 11030 as the number of copy groups that are registered in the copy group definition table 1264 by the copy group name 4120 and that are managed by the host computer 1100 chosen in the host computer selecting screen 10000.

When the copy group selecting screen 11000 is first displayed on the display device 1220, none of the checkboxes 11010 is checked. The administrator can check one or more checkboxes 11010.

The "execute" button 11100 is enabled when the administrator checks one or more checkboxes 11010. When enabled, the "execute" button can be operated (clicked on) by the administrator. As the "execute" button is operated, a copy pair information displaying screen 12000 shown in FIG. 12 is displayed.

The cancel button 11200 is operated to close the copy group selecting screen 11000.

Figure 12:
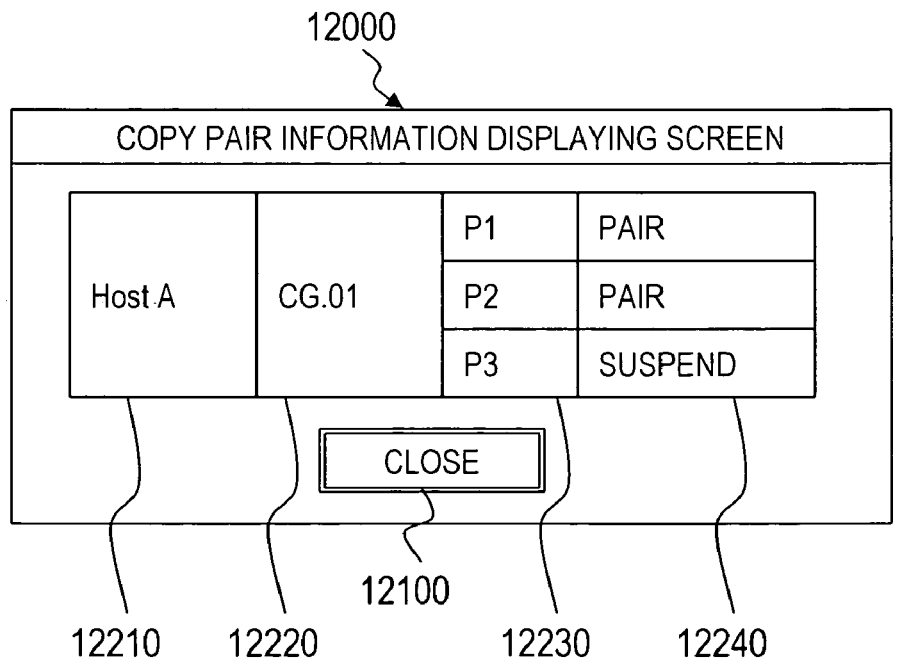
FIG. 12 is a diagram illustrating a copy pair information displaying screen according to the first embodiment of this invention.

FIG. 12 is a diagram illustrating the copy pair information displaying screen 12000 according to the first embodiment of this invention.

The copy pair information displaying screen 12000 is displayed on the display device 1220 when the management program 1265 stored in the management computer 1200 is loaded onto the memory 1250 and executed by the CPU 1230.

The copy pair information displaying screen 12000 contains a host computer name field 12210, a copy group name field 12220, a copy pair name field 12230, and a copy pair information field 12240.

The copy pair information displaying screen 12000 displays the status of copy pairs that constitute a copy group chosen in the copy group selecting screen 11000.

The copy pair information displaying screen 12000 in FIG. 12 displays the status of copy pairs belonging to one copy group. When plural copy groups are chosen in the copy group selecting screen 11000, the copy pair information displaying screen 12000 displays the status of all copy pairs in the chosen copy groups.

Also, the example of the copy pair information displaying screen 12000 shown in FIG. 12 is of when only one host computer 1100 is chosen. When plural host computers 1100 are chosen, on the other hand, the copy pair information displaying screen 12000 displays the status of all copy pairs in copy groups that are managed by the chosen host computers 1100.

The host computer name field 12210 displays the name of the host computer 1100 chosen in the host computer selecting screen 10000. The host computer 1100 displayed in the host computer name field 12210 stores one or more copy group definition tables 1171.

Displayed in the copy group name field 12220 is the name of the copy group chosen in the copy group selecting screen 11000.

The copy pair name field 12230 displays the name of a copy pair belonging to a copy group that is displayed in the copy group name field 12220.

Displayed in the copy pair information field 12240 is the status of a copy pair that is displayed in the copy pair name field 12230.

The following description is about processing executed in the management computer 1200 from when the host computer selecting screen 10000 shown in FIG. 10 is displayed until when the copy pair information displaying screen 12000 shown in FIG. 12 is displayed.

As the host computer 1100 is chosen in the host computer selecting screen 10000, the management program 1265 refers to every copy group definition table 1264 to obtain the name of a copy group that is managed by the host computer 1100 chosen.

Specifically, the management program 1265 selects from among all copy group definition tables 1264 ones whose host name 4110 matches the name of the chosen host computer 1100. The management program 1265 next obtains the copy group name 4120 from each copy group definition table 1264 selected.

The management program 1265 displays the name of the chosen host computer 1100 in the host computer name field 11020 and displays each obtained copy group name (i.e., copy group name 4120) in the copy group name field 11030.

As copy groups are selected in the copy group selecting screen 11000, the management program 1265 obtains, from the copy group definition table 1264, the copy pair name 4130 and copy pair definition information (i.e., the primary storage subsystem name 4140, the primary volume ID 4150, the secondary storage subsystem name 4160, the secondary volume ID 4170) that are associated with each copy group selected.

Specifically, the management program 1265 selects from among all of the selected copy group definition tables 1264 ones whose copy group name 4120 matches the name of any one of the chosen copy groups. The management program 1265 next obtains, from each copy group definition table 1264 selected, the copy pair name 4130, the primary storage subsystem name 4140, the primary volume ID 4150, the secondary storage subsystem name 4160, and the secondary volume ID 4170.

The management program 1265 then chooses from the copy pair monitoring table 1266 every entry whose copy pair definition information matches the obtained copy pair definition information. From every chosen entry, the management program 1265 extracts the copy pair status 9500.

The management program 1265 displays the obtained copy pair name 4130 in the copy pair name field 12230, and displays the extracted copy pair status 9500 in the copy pair information field 12240.

The display screens of FIG. 10 to FIG. 12 are, in this embodiment, displayed on the display device 1220 of the management computer 1200, but may be displayed on display devices of other computers. For instance, the display device 1120 of the host computer 1100 may display the display screens shown in FIG. 10 to FIG. 12.

The host computer selecting screen 10000 in this embodiment allows the administrator to choose one or more host computers 1100 out of all the host computers 1100. Alternatively, only a limited number of host computers 1100 may be chosen in the host computer selecting screen 10000.

How to limit the host computers 1100 that can be chosen by the administrator will be described next.

The administrator first accesses the management computer 1200 through one of the host computers 1100 in the storage system.

The assumption here is that the management computer 1200 stores a host computer IP address table which registers the IP addresses of the host computers 1100.

When accessed by the host computer 1100, the management computer 1200 refers to the host computer IP address table to identify through which host computer 1100 the access has been made. The management computer 1200 then skips displaying the host computer selecting screen 10000 shown in FIG. 10, and displays the names of copy groups managed by the host computer 1100 through which the access has been made in the copy group selecting screen 11000 shown in FIG. 11. The management computer 1200 next displays, in the copy pair information displaying screen 12000 shown in FIG. 12, the status of copy pairs belonging to copy groups that are selected in the copy group selecting screen 11000.

The copy pair information displaying screen 12000 thus displays only the status of copy pairs belonging to copy groups that are managed by the host computer 1100 through which the access has been made. Since configuration information of these copy pairs and the copy pair status are not disclosed to the administrators of other host computers 1100 illicitly, the security of the storage system is improved.

Instead of skipping displaying the host computer selecting screen 10000 of FIG. 10, the management computer 1200 may fix the host computer selecting screen 10000 such that the administrator can only choose the host computer 1100 through which the access has been made.

The description given next is about processing in which the management computer 1200 obtains copy pair information.

The processing of obtaining copy pair information includes processing of creating the information obtaining definition table 1263 and processing of creating the copy pair monitoring table 1266.

The processing in which the management computer 1200 creates the information obtaining definition table 1263 will be described in detail with reference to FIG. 13. The processing in which the management computer 1200 updates the copy pair monitoring table 1266 will be described in detail with reference to FIG. 14.

Processing in which the management computer 1200 creates the information obtaining definition table 1263 is described first.

The information collecting agent 1161 run in the host computer 1100 monitors the copy group definition table 1171 for a change. When there is a change in the copy group definition table 1171, the information collecting agent 1161 notifies the management program 1265, which is run in the management computer 1200, of the change in the copy group definition table 1171.

Notified of the change in the copy group definition table 1171, the management program 1265 executes the processing of creating the information obtaining definition table 1263. The processing of creating the information obtaining definition table 1263 may be executed upon instruction from the administrator to create the information obtaining definition table 1263, instead of upon notification from the information collecting agent 1161.

FIG. 13 is a flow chart for the processing through which the information obtaining definition table 1263 is created by the management program 1265 according to the first embodiment of this invention.

First, when notified of a change in the copy group definition table 1171 from the information collecting agent 1161, the management program 1265 collects the copy group definition table 1171 from every host computer 1100. The management program 1265 stores each collected copy group definition table 1171 in the local disk 1260 (Step 13010). Instead of sending a notification of a change in the copy group definition table 1171 to the management program 1265, the information collecting agent 1161 may send the changed copy group definition table 1171 to the management program 1265. The management program 1265 stores the received copy group definition table 1171 in the local disk 1260.

Next, the management program 1265 deletes information that has been registered in the information obtaining definition table 1263 stored in the memory 1250, thereby initializing the information obtaining definition table 1263 (Step 13020).

The management program 1265 then loads onto the memory 1250 every copy group definition table 1264 that has been stored in the local disk 1260 in the processing of Step 13010 (Step 13030)

For each copy group definition table 1264 loaded onto the memory 1250, the management program 1265 judges whether or not the table holds copy pair definition information (i.e., the primary storage subsystem name 4140, the primary volume ID 4150, the secondary storage subsystem name 4160, and the secondary volume ID 4170) (Step 13040). Judging that the copy group definition table 1264 loaded onto the memory 1250 holds copy pair definition information, the management program 1265 proceeds to processing of Step 13050. On the other hand, when it is judged that the copy group definition table 1264 loaded onto the memory 1250 does not hold copy pair definition information, the processing of creating the information obtaining definition table 1263 is terminated.

In other words, the management program 1265 executes the processing of Steps 13050 to 13080 as long as copy pair definition information is left in the copy group definition table 1264 loaded onto the memory 1250.

When copy pair definition information is found in the copy group definition table 1264 loaded onto the memory 1250, the management program 1265 picks up definition information of one copy pair out of copy pair definition information that is held in the copy group definition table 1264 loaded onto the memory 1250, and deletes the picked up copy pair definition information from the copy group definition table 1264 (Step 13050).

The management program 1265 next creates a new entry in the information obtaining definition table 1263. The management program 1265 registers the picked up copy pair definition information in the newly created entry (Step 13060).

Next, the management program 1265 judges whether or not the same information as the copy pair definition information picked up through the processing of Step 13050 is held in other copy group definition tables 1264 than the one from which this copy pair definition information has been picked up (Step 13070). Judging that other copy group definition tables 1264 do not hold this copy pair definition information, the management program 1265 returns to the processing of Step 13040.

Judging that other copy group definition tables 1264 hold this copy pair definition information, the management program 1265 deletes the copy pair information from those other copy group definition tables 1264 (Step 13080).

Copy pairs that have identical values in all of the primary storage subsystem name, primary volume ID, secondary storage subsystem name, and secondary volume ID fields are deemed as the same copy pair irrespective of whether their copy pair names are the same or different.

The management program 1265 repeats the processing of Steps 13040 to 13080 until no copy pair definition information is left in the copy group definition table 1264 loaded onto the memory 1250. When there is no more copy pair definition information left in the copy group definition table 1264 loaded onto the memory 1250, the management program 1265 ends the processing of creating the information obtaining definition table 1263.

After the creation of the information obtaining definition table 1263 is completed, the management program 1265 executes the processing of creating the copy pair monitoring table 1266 based on the created information obtaining definition table 1263 until a change occurs in the copy group definition table 1171 stored in the host computer 1100.

The information obtaining definition table 1263 avoids registering information of the same copy pair more than once, thereby preventing the management program 1265 from obtaining status information of the same copy pair twice or more in one round, or cycle, of information collecting. This makes it possible to provide a storage system that collects the copy pair status without burdening the storage subsystem 1000 with an excess load.

The processing in which the management computer 1200 updates the copy pair monitoring table 1266 is now described.

FIG. 14 is a flow chart for the processing through which the copy pair monitoring table 1266 is created by the management program 1265 according to the first embodiment of this invention.

The processing of creating the copy pair monitoring table 1266 is processing in which the management program 1265 periodically collects the status of copy pairs registered in the information obtaining definition table 1263, and registers the collected copy pair status in the copy pair monitoring table 1266. The cycle in which the management program 1265 collects the status of copy pairs registered in the information obtaining definition table 1263 may be set in the management program 1265 in advance, or may be set by the administrator.

As the first step of this processing, the management program 1265 secures an area in the memory 1250 to store a counter, and initializes the counter to 0 (Step 14010). The counter is provided by a timer function of the management program 1265.

Next, the management program 1265 judges whether or not an instruction to end copy pair monitoring has been given from the administrator (Step 14020). Judging that the administrator has given an instruction to end copy pair monitoring, the management program 1265 terminates the processing of creating the copy pair monitoring table 1266.

On the other hand, when it is judged that the administrator has not given an instruction to end copy pair monitoring, the management program 1265 judges whether or not the counter has counted up the cycle for collecting the copy pair status (Step 14030). Judging that the counter has not finished counting up the cycle for collecting the copy pair status, the management program 1265 returns to the processing of Step 14020. In the processing of Step S14020, the management program 1265 terminates the processing of creating the copy pair monitoring table 1266 when an instruction to end copy pair monitoring is given from the administrator within the cycle for collecting the copy pair status.

On the other hand, when it is judged that the counter has counted up the cycle for collecting the copy pair status, the management program 1265 collects the status of copy pairs registered in the information obtaining definition table 1263 (Step 14040).

Specifically, the management program 1265 sends a request to collect the copy pair status to each host computer 1100 registered in the information obtaining definition table 1263 by the host computer name 8110. This request contains copy pair definition information (i.e., the primary storage subsystem name 8130, the primary volume ID 8140, the secondary storage subsystem name 8150, and the secondary volume ID 8160).

Receiving the request, the host computer 1100 implements the recovery manager 1162. The recovery manager 1162 sends a request to collect the copy pair status to the storage subsystem 1000 that is specified in the request by the primary storage subsystem name 8130 and to the storage subsystem 1000 that is specified in the request by the secondary storage subsystem name 8150.

Receiving the request, the primary and secondary storage subsystems 1000 each execute their own storage microprograms 1028. The storage microprogram 1028 that is executed in the primary storage subsystem 1000 fetches the status of the volume 1011 that is identified by the primary volume ID 4150 contained in the request. The storage microprogram 1028 that is executed in the secondary storage subsystem 1000 fetches the status of the volume 1011 that is identified by the secondary volume ID 4170 contained in the request.

The storage microprograms 1028 executed in the primary and secondary storage subsystems 1000 send the fetched status of the volumes 1011 to the host computer 1100 that has made the request. Receiving the status of the volumes 1011, the host computer 1100 identifies from the received status of the volumes 1011 the copy pair status of the copy pair definition information contained in the request. The host computer 1100 sends the identified copy pair status to the management computer 1200.

The management computer 1200 thus collects the status of copy pairs registered in the information obtaining definition table 1263.

The management program 1265 then makes the collected copy pair status reflected in the copy pair monitoring table 1266 (Step 14050), and returns to Step 14010.

A description will be given next with reference to FIG. 10 to FIG. 12 on a procedure that is employed by the administrator to monitor the copy pair status.

The description takes as an example a procedure in which the administrator of the application 1163 that is stored in the host computer 1100A monitors copy pairs to be managed.

First, the administrator calls up a monitoring function of the management program 1265. The administrator can call up the monitoring function of the management program 1265 through, for example, the management computer 1200.

As the monitoring function of the management program 1265 is called up, the host computer selecting screen 10000 shown in FIG. 10 is displayed. The administrator checks one or some of the checkboxes 10010 displayed on the host computer selecting screen 10000 that correspond to the host computers 1100 to be monitored (in this example, Host A), and operates, or clicks on, the "execute" button (i.e., OK button) 10100. As the "execute" button is operated, the copy group selecting screen 11000 is displayed.

The administrator checks one or some of the checkboxes 11010 displayed on the copy group selecting screen 11000 that correspond to copy groups to be monitored (in this example, CG. A), and operates the "execute" button 11100. As the "execute" button 11100 is operated, the management program 1265 collects from the copy pair monitoring table 1266 the status of copy pairs that belong to the selected copy groups, and causes the copy pair information displaying screen 12000 to be displayed.

The copy pair information displaying screen 12000 displays the collected copy pair status. The administrator operates a "close" button 12100 to close the copy pair information displaying screen 12000.

The copy pair information displaying screen 12000 in this embodiment displays the copy pair status only once and the displayed copy status information is not updated. However, an "update" button may be added to the copy pair information displaying screen 12000 so that, when the administrator operates the "update" button, the management program 1265 again fetches the copy pair status from the copy pair monitoring table 1266 and makes the copy pair information displaying screen 12000 display the fetched copy pair status again.

Alternatively, the management program 1265 may automatically update the copy pair information displaying screen 12000 at the intervals in which the copy pair monitoring table 1266 is created.

In this embodiment, one host computer 1100 is chosen in the host computer selecting screen 10000 and one copy group is chosen in the copy group selecting screen 11000. Alternatively, plural host computers and copy groups may be chosen in the screens 10000 and 11000, respectively.

Second Embodiment

The information obtaining definition table 1263 is created in the first embodiment by deleting duplicate definition information of the same copy pair among copy pair definition information registered in the copy group definition tables 1264. No two pieces of copy pair status information obtained from the thus created information obtaining definition table 1263 overlap.

In a second embodiment of this invention, when every piece of copy pair definition information registered in one copy group definition table 1264 is found in any one of other copy group definition tables 1264, this copy group definition table 1264, whose every piece of copy pair definition information has a duplicate, is deleted. Then the management program 1265 collects the status of copy pairs that are registered in the remaining copy group definition tables 1264.

The second embodiment will be described with reference to FIG. 15 and FIG. 16. In the second embodiment, descriptions on the same components as those in the first embodiment will be omitted.

The configuration of a storage system according to the second embodiment of this invention is described with reference to FIG. 1.

The memory 1250 of the management computer 1200 in the second embodiment does not store the information obtaining definition table 1263. The memory 1250 stores the copy group definition table 1264 and a definition count table 15000 instead.

FIG. 15 is a diagram showing the configuration of the definition count table 15000 according to the second embodiment of this invention.

The definition count table 15000 contains, in each row, a primary storage subsystem name 15100, a primary volume ID 15200, a secondary storage subsystem name 15300, a secondary volume ID 15400, and a definition count 15500.

The primary storage subsystem name 15100, the primary volume ID 15200, the secondary storage subsystem name 15300, and the secondary volume ID 15400 indicate the same names or IDs as in the copy group definition tables 1171 of FIG. 4 to FIG. 7, and their descriptions will therefore be omitted.

Registered as the definition count 15500 is the number of times a copy pair is defined in the copy group definition tables 1264. Specifically, in the case where the same copy pair definition information is found in plural copy group definition tables 1264 loaded onto the memory 1250, a number indicating how many copy pairs have the identical copy pair information is registered as the definition count 15500.

Processing in which the management computer 1200 obtains copy pair information consists of, when every piece of copy pair definition information registered in one copy group definition table 1264 is found in any other copy group definition tables 1264, processing of deleting this copy group definition table 1264 and processing of updating the copy pair monitoring table 1266.

The processing of updating the copy pair monitoring table 1266 in the second embodiment is the same as in the first embodiment, and a description thereof will be omitted. Described here is processing that is employed by the management program 1265 to choose which copy group definition table 1264 is to be referred to in collecting the copy pair status.

The management program 1265 obtains the copy group definition table 1171 stored in the host computer 1100, and stores the obtained copy group definition table 1171 in the local disk 1260. Stored in the memory 1250 of the management computer 1200 is a subset of the copy group definition tables 1264 after the management program 1265 executes processing shown in FIG. 16 to choose which copy group definition table 1264 is to be referred to in collecting the copy pair status.

Figure 16:
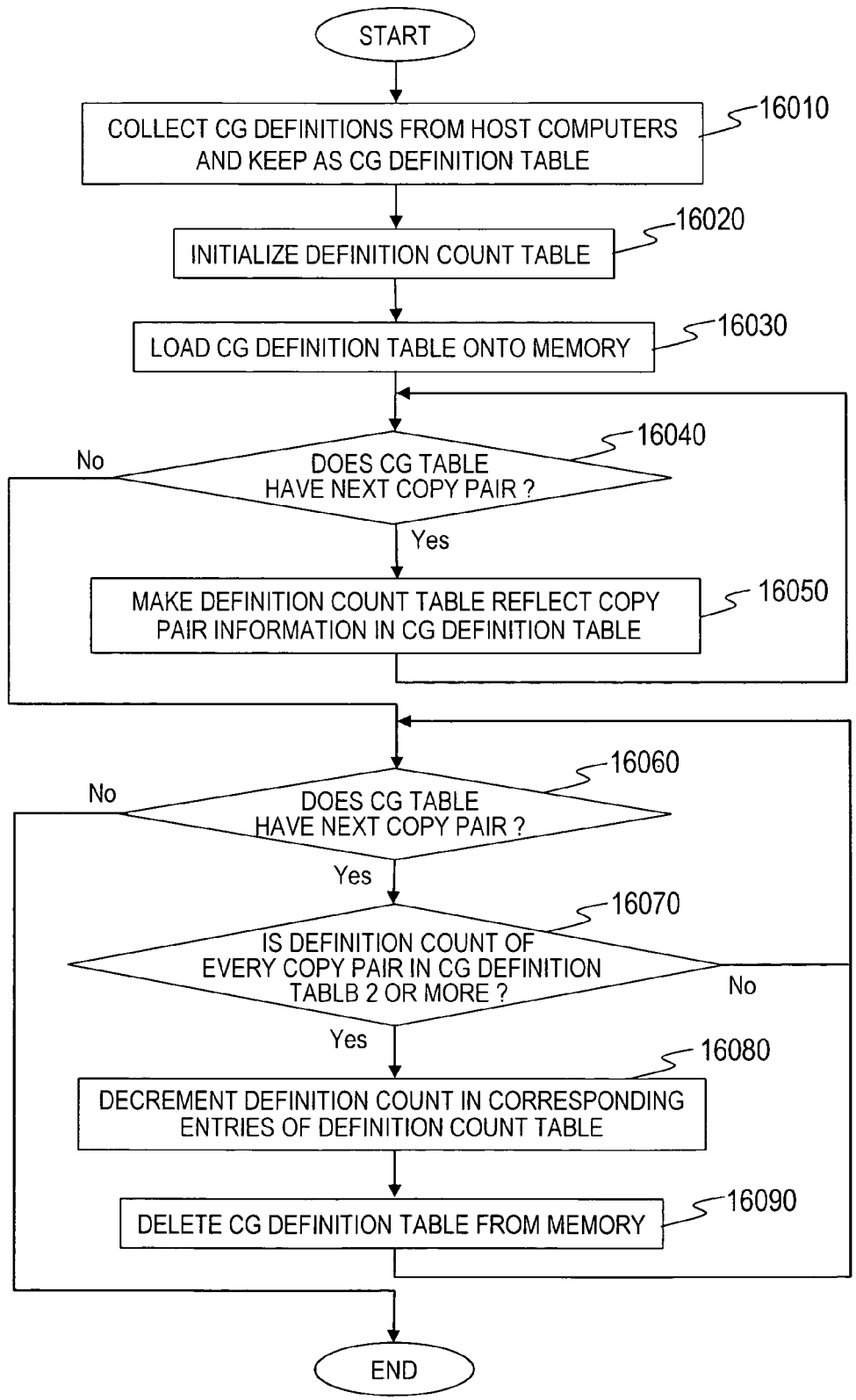
FIG. 16 is a flow chart for processing that is executed by a management program according to the second embodiment of this invention to choose which copy group definition table is referred to in fetching the copy pair status.

FIG. 16 is a flow chart for the processing that is employed by the management program 1265 according to the second embodiment of this invention to choose which copy group definition table 1264 is to be referred to in collecting the copy pair status.

The management program 1265 first collects the copy group definition tables 1171 from the host computers 1100 through the information collecting agent 1161, and stores the obtained copy group definition tables 1171 in the local disk 1260 (Step 16010).

Next, the management program 1265 deletes information that has been registered in the definition count table 15000 stored in the memory 1250 of the management computer 1250, thereby initializing the definition count table 15000 (Step 16020).

The management program 1265 then loads onto the memory 1250 every copy group definition table 1264 stored in the local disk 1260 (Step 16030)

The management program 1265 executes a processing of Step 16050 for every copy group definition table 1264 loaded onto the memory 1250 (Steps 16040 and 16050). After completion of the processing of Step 16050 for all copy group definition tables 1264, the management program 1265 proceeds to processing of Step 16060 (Step 16040).

The management program 1265 picks up copy pair definition information held in the copy group definition table 1264 loaded onto the memory 1250, and makes the picked up copy pair definition information reflected in the definition count table 15000 (Step 16050).

Specifically, when the picked up copy pair information matches copy pair definition information registered in the definition count table 15000, the management program 1265 increments a value registered as the definition count 15050 in the definition count table 15000. In the case where the picked up copy pair definition information matches none of the copy pair definition information registered in the definition count table 15000, the management program 1265 adds a new entry to the definition count table 15000. The management program 1265 registers "1" as the definition count 15050 of the added entry, and stores the picked up copy pair definition information in the added entry.

Through the processing of Steps 16040 to 16050, the management program 1265 creates the definition count table 15000. The definition count table 15000 shows, about each piece of copy pair definition information, how many times in total the copy pair definition information in question has been defined in the copy group definition tables 1264 loaded onto the memory 1250.

The management program 1265 next executes processing of Steps 16060 to 16090 to select from among the copy group definition tables 1264 loaded onto the memory 1250 ones that are necessary in collecting the copy pair status, and to delete the copy group definition tables 1264 that are deemed unnecessary from the memory 1250.

The management program 1265 executes the processing of Steps 16060 to 16090 for every copy group definition table 1264 loaded onto the memory 1250 (Steps 16060 to 16090). After completion of the processing of Steps 16060 to 16090 for all copy group definition tables 1264, the management program 1265 terminates the processing.

The management program 1265 chooses every entry of the definition count table 15000 that holds copy pair definition information identical with any piece of copy pair information registered in the picked up copy group definition table 1264. From each chosen entry, the management program 1265 extracts the definition count 15500. The management program 1265 then judges whether or not the extracted definition count 15500 is equal to or larger than "2" (Step 16070).

Judging that the definition count 15500 is smaller than "2" (i.e., when the definition count 15500 is "1"), the management program 1265 returns to the processing of Step 16060.

Judging that the definition count 15500 is "2" or larger, the management program 1265 decrements the extracted definition count 15500 (Step 16080).

The management program 1265 then deletes the picked up copy group definition table 1264 from the memory 1250 (Step 16090).

The duplicate copy group definition table 1264 is deleted from the memory 1250 by executing the processing of Steps 16060 to 16090.

Thus, the memory 1250 now stores a subset of the copy pair monitoring tables 1264 stored in the local disk 1260. The management program 1265 collects the copy pair status based on copy pair definition information that is registered in the subset of the copy group definition tables 1264 stored in the memory 1250. This enables the management program 1265 to collect the copy pair status without missing any copy pair. Further, this causes the management program 1265 to generate less load while monitoring the storage subsystem 1000 than in the case where the copy pair status is collected with the use of every copy group definition table 1264.

Third Embodiment

The storage systems according to the first embodiment and the second embodiment lessen the load on the storage subsystem 1000 by avoiding monitoring the same copy pair twice or more in one round of monitoring. However, the storage systems according to the first embodiment and the second embodiment do not deal with a matter about which host computer 1100 is to be engaged in monitoring a copy pair when the copy pair is managed by more than one host computer 1100.

In addition, copy pair monitoring through the host computer 1100 burdens the host computer 1100 with the load of monitoring copy pairs. For instance, when a copy pair is managed by the host computer 1100 where an application of a service is run and by the backup host computer 1100, the load of copy pair monitoring affects the service less if it is the backup host computer 1100 that collects the copy pair status.

In a third embodiment of this invention, the administrator of the storage system sets an order of priority to the host computers 1100. When the host computer 1100 that is given a high priority level and the host computer 1100 that is given a low priority level manage the same copy pair, the host computer 1100 of low priority obtains copy pair information. A service is thus affected less by copy pair monitoring.

The third embodiment will be described with reference to FIG. 17 and FIG. 18. In the third embodiment, descriptions on the same components as those in the first embodiment will be omitted.

The memory 1250 of the management computer 1200 in a storage system according to the third embodiment of this invention stores a copy group priority table 18000. The rest of the storage system according to the third embodiment is the same as the storage system according to the first embodiment of this invention, and repetition of the same descriptions will be avoided.

Figures 17, 18:
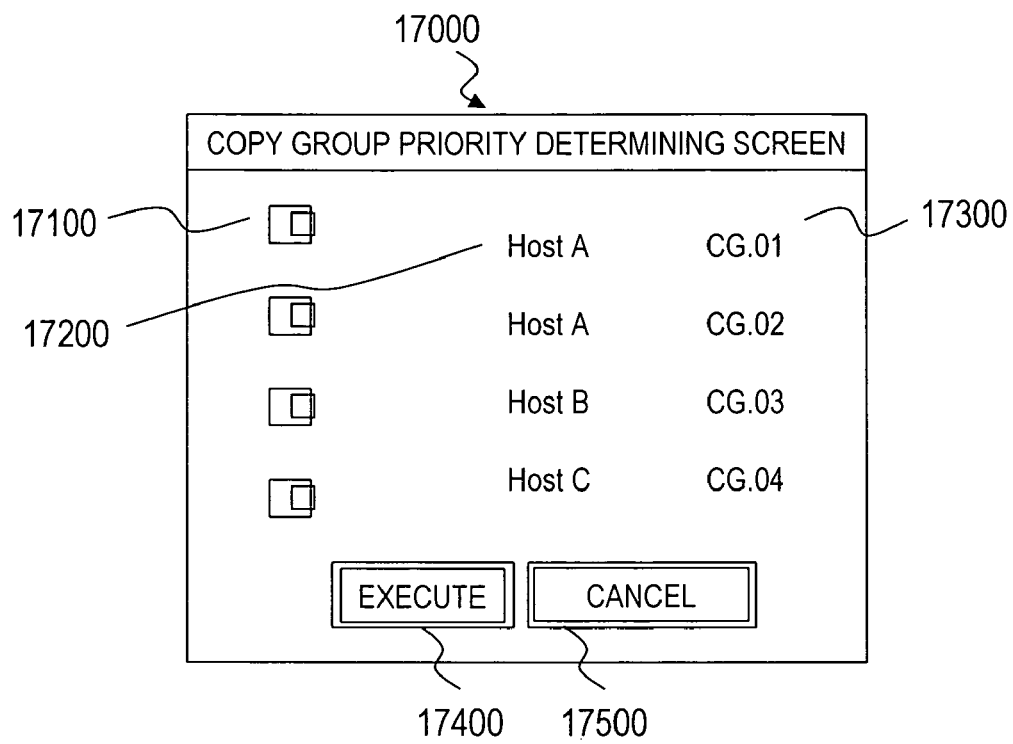
FIG. 17 is a diagram illustrating a copy group priority determining screen according to a third embodiment of this invention.
FIG. 18 is a diagram showing the configuration of a copy group priority table according to the third embodiment of this invention.

FIG. 17 is a diagram illustrating a copy group priority determining screen 17000 according to the third embodiment of this invention.

The copy group priority determining screen 17000 is a graphical user interface (GUI) called up by the administrator.

The copy group priority determining screen 17000 contains a priority level input field 17100, a host computer name field 17200, a copy group name field 17300, an "execute" button (i.e., OK button) 17400 and a cancel button 17500.

The priority level of a copy group is entered in the priority level input field 17100. The priority level of a copy group is set by the administrator. For instance, the administrator assigns a high priority level to a copy group that is used to provide a service, and a low priority level to a copy group for uses that are not directly relevant to the service. The administrator may set a high priority level to a copy group to which only a few resources are available, and a low priority level to a copy group to which a lot of resources are available. A larger value entered in the priority level input field 17100 means a lower priority level for the copy group whereas a smaller value entered in the priority level input field 17100 means a higher priority level for the copy group.

The priority level is entered on a copy group basis in the copy group priority determining screen 17000 shown in FIG. 17. Alternatively, the priority level may be determined for each host computer 1100 so that copy groups that are managed by the same host computer 1100 are all given the same priority level.

The name of the host computer 1100 is entered in the host computer name field 17200. The name of a copy group is entered in the copy group name field 17300.

As the "execute" button is operated, or clicked on, the copy group priority table 18000 shown in FIG. 18 is updated according to a priority level set in the copy group priority determining screen 17000.

The cancel button 17500 is operated to close the copy group priority determining screen 17000.

FIG. 18 is a diagram showing the configuration of the copy group priority table 18000 according to the third embodiment of this invention.

The copy group priority table 18000 is stored in the memory 1250 of the management computer 1200.

The copy group priority table 18000 contains a priority level 18100, a copy group name 18200 and a host computer name 18300 in each row.

A priority level is registered as the priority level 18100. The name of a copy group is registered as the copy group name 18200. Registered as the host computer name 18300 is the name of the host computer 1100 that manages the copy group identified by the registered copy group name 18200. A larger value registered as the priority level 18100 means a lower priority level for the copy group whereas a smaller value registered as the priority level 18100 means a higher priority level for the copy group.

Processing of collecting the copy pair status according to the third embodiment consists of processing in which the management program 1265 creates the information obtaining definition table 1263 and processing in which the management program 1265 updates the copy pair monitoring table 1266. The processing in which the management program 1265 updates the copy pair monitoring table 1266 is the same as in the first embodiment, and a description thereof will be omitted.

Described here is a difference between the processing in which the management program 1265 creates the information obtaining definition table 1263 according to the third embodiment and the corresponding processing of the first embodiment.

The administrator calls up the copy group priority determining screen 17000 to set an order of priority to copy groups in advance. Once an order of priority is set to copy groups, the copy group priority table 18000 is created in the memory 1250.

Thereafter, through the processing of Step 13030 in the processing of creating the information obtaining definition table 1263 shown in FIG. 13, the management program 1265 loads the copy group definition tables 1264 onto the memory 1250 in descending order of values registered as the priority 18100 in the copy group priority table 18000. In the case where the copy group priority table 18000 is as shown in FIG. 18, the copy group definition table 1264 that is loaded onto the memory 1250 by the management program 1265 first is the copy group definition table 1264 that is associated with the copy group CG. 04, which is given a priority level "4".

Next, through the processing of Step 13050, the management program 1265 chooses the copy group definition tables 1264 one by one in an order in which the copy group definition tables 1264 have been loaded onto the memory 1250. The management program 1265 repeatedly performs the following processing on the chosen copy group definition tables 1264. From each chosen copy group definition table 1264, the management program 1265 extracts the host computer name 4110, the copy pair name 4130, and copy pair definition information.

The management program 1265 then creates a new entry in the information obtaining definition table 1263 through the processing of Step 13060. The management program 1265 registers the extracted host computer name 4110, copy pair name 4130, and copy pair definition information in the newly created entry.

In this manner, when a copy pair is managed by plural host computers 1100, definition information of copy pairs belonging to a low priority copy group is registered in the information obtaining definition table 1263.

Accordingly, when a copy pair is managed by plural host computers 1100, the host computer 1100 that manages a low priority copy group collects the copy pair status. A service application run in the host computer 1100 of high priority is thus less affected by copy pair monitoring.

Fourth Embodiment

While the administrator sets an order of priority to copy groups in the third embodiment, a fourth embodiment of this invention has the management computer 1200 set an order of priority to copy groups according to a priority determining rule which is laid down in advance.

Described below is the difference between the fourth embodiment and the third embodiment.

Figure 19:
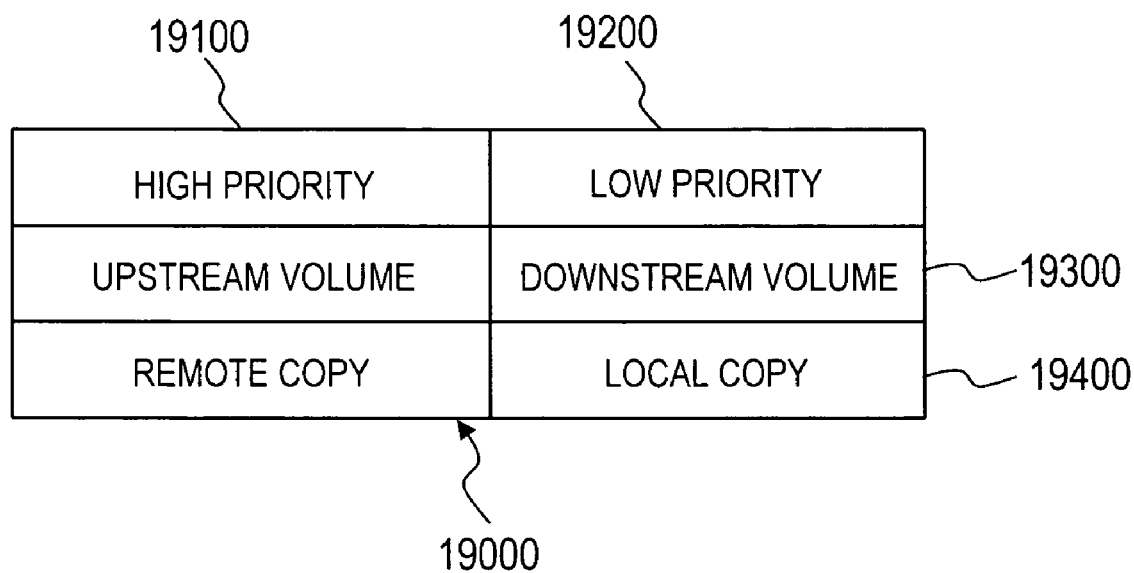
FIG. 19 is a diagram showing the configuration of a copy group priority determining rule table according to a fourth embodiment of this invention.

FIG. 19 is a diagram showing the configuration of a copy group priority determining rule table 19000 according to the fourth embodiment of this invention.

The copy group priority determining rule table 19000 contains a priority level "high" field 19100 and a priority level "low" field 19200.

A rule for setting a high priority level is registered in the priority level "high" field 19100. A rule for setting a low priority level is registered in the priority level "low" field 19200.

A row 19300 and a row 19400 hold rules for setting a priority level.

The row 19300 holds a rule in which the priority level is determined by whether the volume 1011 constituting a copy pair is in the upstream or the downstream. Generally speaking, an upstream volume is a source volume from which data is copied and a downstream volume is a target volume to which data is copied.

To give an example, a volume A and a volume B form a copy pair with the volume A as the primary volume and the volume B as the secondary volume. The volume B is also paired with a volume C, and the volume B serves as the primary volume of this copy pair while the volume C serves as the secondary volume.

In this case, the volume A is an upstream volume to the volume B and the volume C. The volume B is a downstream volume to the volume A and an upstream volume to the volume C. The volume C is a downstream volume to the volume A and the volume B.

The most upstream volume (the volume A) is more often than not the volume 1011 that is directly related to a service application executed in the host computer 1100. Accordingly, when two volumes 1011 form a copy pair and have an upstream/downstream relation, the upstream volume 1011 is given a high priority level whereas a low priority level is assigned to the downstream volume 1011.

The row 19400 holds a rule in which the priority level of a copy group constituted of copy pairs where remote copy is executed is set higher than that of a copy group constituted of copy pairs where local copy is executed.

In general, a copy pair between which remote copy is executed is more likely to be affected by a failure than a copy pair between which local copy is executed. It is for this reason that the priority level of a copy group constituted of copy pairs where remote copy is executed is set higher than that of a copy group constituted of copy pairs where local copy is executed.

The rule held in the row 19400 may be modified such that the administrator sets the priority level of a copy group constituted of copy pairs where local copy is executed higher than that of a copy group constituted of copy pairs where remote copy is executed, depending on the environment, operation characteristics, and other characteristics of the storage system.

The administrator can add an entry to the copy group priority determining rule table 19000. The administrator can also remove an entry from the copy group priority determining rule table 19000. This enables the administrator to add or delete a rule for determining the priority level to and from the copy group priority determining rule table 19000.

In the processing of Step 13030 shown in FIG. 13, when loading the copy group definition tables 1264 onto the memory 1250, the management program 1265 creates the copy group priority table 18000 according to the copy group priority determining rule table 19000. Specifically, the management program 1265 determines the priority level of a copy group according to rules registered in the copy group priority determining rule table 19000.

The procedure of determining the priority level will be described taking as an example a case in which the copy group definition tables 1171 shown in FIG. 4 to FIG. 7 are respectively stored in the host computers 1100 of the storage system shown in FIG. 3. In the description, A>B indicates that the priority level of A is higher than that of B.

According to the rule of the row 19300, the priority levels of the copy pairs in FIG. 3 are: P5>P9; P6>P10; P7>P11; and P8>P12.

According to the rule of the row 19400, copy pairs where remote copy is executed (i.e., P5, P6, P7, and P8) are assigned higher priority levels than those of copy pairs where local copy is executed (i.e., P1, P2, P3, P4, P9, P10, P11, and P12).

In the case of the storage system shown in FIG. 3, not all of the copy groups are uniquely assigned a priority level by the rules held in the rows 1930 and 1940. However, copy pairs where remote copy is executed and that are the most upstream pairs (P5, P6, P7, and P8) are given the highest priority level. Copy pairs where local copy is executed and that are the most upstream pairs (P1, P2, P3, and P4) are given the second highest priority level. Copy pairs where local copy is executed and that are the most downstream pairs (P9, P10, P11, and P12) are given the lowest priority level.

It is thus determined that the copy group 3111 constituted of the copy pairs P1, P2, and P3 is to have a higher priority level than that of the copy group 3131 constituted of the copy pairs P9, P10, P11, and P12.

In the manner described above, only definitions of copy pairs that would affect a service relatively little are registered in the information obtaining definition table 1263 without needing the administrator to set a priority level to each copy group. This means that, when a copy pair is managed by plural host computers 1100, the host computer 1100 that manages a copy group of low priority collects the copy pair status. A service application run in the host computer 1100 that manages a copy group of high priority level is thus affected less by copy pair monitoring.

While the present invention has been described in detail and pictorially in the accompanying drawings, the present invention is not limited to such detail but covers various obvious modifications and equivalent arrangements, which fall within the purview of the appended claims.

What is claimed is:

1. A storage system, comprising:
    a plurality of host computers;
    at least one storage subsystem; and
    a management computer,
    wherein each storage subsystem includes volumes storing data requested by the host computers to be written, the volumes including primary volumes from which data is copied, and secondary volumes to which data is copied,
    wherein the primary volumes and the secondary volumes form copy pairs,
    wherein the management computer is configured to:
    (A) obtain a plurality of copy pair definition information from each of the plurality of host computers, the plurality of copy pair definition information indicating associations between the primary volumes and the secondary volumes;

(B) remove at least one duplicate copy pair definition information from the copy pair definition information obtained from the plurality of host computers by executing to:

(B1) pick up a certain copy pair definition information from the plurality of copy pair definition information obtained from the plurality of host computers, register the certain copy pair definition information in an information obtaining definition table and delete the certain copy pair definition information from the plurality of copy pair definition information obtained from the plurality of host computers;

(B2) remove a copy pair definition information which duplicates the certain copy pair definition information from the plurality of copy pair definition information obtained from the plurality of host computers; and (B3) repeat steps (B1) and (B2) until no copy pair definition information is left in the plurality of copy pair definition information obtained from the plurality of host computers; and (C) collect copy pair statuses of the copy pairs from the at least one storage subsystem via each of the host computers, based on the copy pair definition information registered in the information obtaining definition table, to avoid obtaining copy pair status of the same copy pair more than once.

2. The storage system according to claim 1,
wherein the copy pairs are grouped together by service type into copy groups,
wherein the management computer manages, as copy group definition information, copy pair definition information of copy pairs belonging to one of the copy groups, and
wherein the management computer obtains copy group definition information from the host computers for the obtaining of the copy pair definition information.

3. The storage system according to claim 2, wherein in case a certain copy group is chosen, the management computer displays a part of the collected copy pair statuses associated with copy pairs belonging to the chosen copy group.

4. The storage system according to claim 2, wherein the management computer removes certain copy group definition information including the duplicate copy pair definition information.

5. The storage system according to claim 2, wherein the management computer stores priorities of the copy groups, and
wherein, if the duplicate copy pair definition information is contained in both first copy group definition information corresponding to a first copy group having a high priority and second copy group definition information corresponding to a second copy group having a low priority, the management computer removes the duplicate copy pair definition information from the first copy group definition information, based on the priorities of the copy groups.

6. The storage system according to claim 5,
wherein the management computer stores a rule for determining the priorities, and
wherein the management computer determines the priorities according to the rule stored in the third memory.

7. The storage system according to claim 6, wherein the management computer receives an input of the rule.

8. A management computer coupled to a plurality of host computers and at least one storage subsystem coupled to the host computers and providing volumes storing data requested by the host computers to be written, comprising:
a memory storing a plurality of copy pair definition information from each of the host computers, the plurality of copy pair definition information indicating associations between primary volumes and secondary volumes forming copy pairs; and
a processor obtaining the plurality of copy pair definition information stored in each of the plurality of host computers,
wherein the primary volumes are a part of volumes from which data is copied, and the secondary volumes are a part of volumes to which data is copied,
wherein the processor is configured to:

(A) remove at least one duplicate copy pair definition information from the copy pair definition information obtained from the plurality of host computers by executing to:

(A1) pick up a certain copy pair definition information from the plurality of copy pair definition information obtained from the plurality of host computers, register the certain copy pair definition information in an information obtaining definition table and delete the certain copy pair definition from the plurality of copy pair definition information obtained from the plurality of host computers;

(A2) remove a copy pair definition information which duplicates the certain copy pair definition information from the plurality of copy pair definition information obtained from the plurality of host computers; and (A3) repeat steps (A1) and (A2) until no copy pair definition information is left in the plurality of copy pair definition information obtained from the plurality of host computers; and (B) collect copy pair statuses of the copy pairs from the at least one storage subsystem via each of the host computers, based on the copy pair definition information registered in the information obtaining definition table, to avoid obtaining copy pair status of the same copy pair more than once.

9. The management computer according to claim 8,
wherein copy pairs are grouped together by service type into copy groups,
wherein the processor manages, as copy group definition information, copy pair definition information of copy pairs belonging to one of the copy groups, and
wherein the processor obtains copy group definition information from the host computers for the obtaining of the copy pair definition information.

10. The management computer according to claim 9, comprising:
an input device receiving an identifier of a certain copy group; and
a display device displaying a part of the collected copy pair statuses associated with copy pairs belonging to the certain copy group.

11. The management computer according to claim 9,
wherein the management computer removes certain copy group definition information including the duplicate copy pair definition information and not including unduplicate copy pair definition information.

12. The management computer according to claim 9,
wherein the memory stores priorities of the copy groups, and wherein, if the duplicate copy pair definition information is contained in both a first copy group definition information corresponding to a first copy group having a high priority and second copy group definition information corresponding to a second copy group having a low priority, the processor removes the duplicate copy pair definition information from the first copy group definition information, based on the priorities of the copy groups.

13. The management computer according to claim 12, wherein the memory stores a rule for determining the priorities, and determines the priorities according to the stored rule.

14. The management computer according to claim 13, wherein the input device receives an input of the rule to be stored in the memory.

15. A method of monitoring copy pairs in a storage system including a plurality of host computers, at least one storage subsystem, and a management computer, the at least one storage subsystem providing volumes storing data requested by the host computers to be written, the management computer being accessible to the host computers and the at least one storage subsystem, the volumes including primary volumes from which data is copied and secondary volumes to which data is copied, the primary volumes and the secondary volumes forming copy pairs, the method comprising:
  (A) obtaining a plurality of copy pair definition information from each of the plurality of host computers, the plurality of copy pair definition information indicating associations between the primary volumes and the secondary volumes;
  (B) removing at least one duplicate copy pair definition information from the copy pair definition information obtained from the plurality of host computers by executing:
  (B1) picking up a certain copy pair definition from the plurality of copy pair definition information obtained from the plurality of host computers, registering the certain copy pair definition information in an information obtaining definition table and deleting the certain copy pair definition information from the plurality copy pair definition information obtained from the plurality of host computers;
  (B2) removing a copy pair definition information which duplicates the certain copy pair definition information from the plurality of copy pair definition information obtained from the plurality of host computers; and
  (B3) repeating steps (B1) and (B2) until no copy pair definition information is left in the plurality of copy pair definition information obtained from the plurality of host computers; and
  (C) collecting copy pair statuses of the copy pairs from the at least one storage subsystem via each of the host computers, based on the copy pair definition information registered in the information obtaining definition table, to avoid obtaining copy pair status of the same copy pair more than once.

16. The method of monitoring copy pairs according to claim 15,
  wherein copy pairs are grouped together by service type into copy groups,
  the method further comprising:
  managing, as copy group definition information, copy pair definition information of copy pairs belonging to one of the copy groups; and
  obtaining copy group definition information from the host computers for the obtaining of the copy pair definition information.

17. The method of monitoring copy pairs according to claim 16, further comprising:
  displaying, when one copy group is chosen, the collected copy pair statuses associated with copy pairs belonging to the chosen copy group.

18. The method of monitoring copy pairs according to claim 16, further comprising:
  removing certain copy group definition information including the duplicate copy pair definition information and not including unduplicate copy pair definition information.

19. The method of monitoring copy pairs according to claim 16, further comprising:
  storing priorities of the copy groups; and
  removing, if the duplicate copy pair definition information is contained in both first copy group definition information corresponding to a first copy group having a high priority and second copy group definition information corresponding to a second copy group having a low priority, the duplicate copy group definition information from the first copy group definition information.

20. The method of monitoring copy pairs according to claim 19, further comprising:
  storing a rule for determining the priority; and
  determining the priority according to the rule.

21. The storage system according to claim 1, wherein the host computers each include at least one application program, and wherein the management computer is a separate computer from the host computers and is dedicated to management operations utilizing a management program, and further wherein the management computer does not include any application programs.

22. The management computer according to claim 8, wherein the host computers each include at least one application program, and wherein the management computer is a separate computer from the host computers and is dedicated to management operations utilizing a management program, and further wherein the management computer does not include any application programs.

23. The method according to claim 15, wherein the host computers each include at least one application program, and wherein the management computer is a separate computer from the host computers and is dedicated to management operations utilizing a management program, and further wherein the management computer does not include any application programs.

24. A storage system, comprising:
  a plurality of host computers;
  at least one storage subsystem; and
  a management computer,
  wherein each storage subsystem includes volumes storing data requested by the host computers to be written, the volumes including primary volumes from which data is copied, and secondary volumes to which data is copied,
  wherein the primary volumes and the secondary volumes form copy pairs,
  wherein the management computer is configured to:
  (A) obtain a plurality of copy pair definition information from each of the plurality of host computers, the plurality of copy pair definition information indicating associations between the primary volumes and the secondary volumes;
  (B) remove at least one duplicate copy pair definition information from the copy pair definition information obtained from the plurality of host computers by executing to:

(B1) pick up a certain copy pair definition information from the plurality of copy pair definition information obtained from the plurality of host computers, register the certain copy pair definition information in an information obtaining definition table and delete the certain copy pair definition information from the plurality copy pair definition information;

(B2) remove a copy pair definition information which duplicates the certain copy pair definition information from the plurality of copy pair definition information obtained from the plurality of host computers; and (B) repeat steps (B1) and (B2) until no copy pair definition information is left in the plurality of copy pair definition information obtained from the plurality of host computers;

(C) for each of the copy pairs, acquire a host computer requested by the management computer from the plurality of host computers, wherein the requested host computer collects copy pair status of a corresponding copy pair based on the copy pair definition information obtained from the plurality of host computers registered in the information obtaining definition table, to avoid obtaining copy pair status of the same copy pair more than once, and (D) request to collect copy pair statuses of the copy pairs from the at least one storage subsystem to the requested host computer based on obtaining copy pair definition information from which the duplicate copy pair definition information has been removed.

25. A management computer coupled to a plurality of host computers and at least one storage subsystem coupled to the host computers and providing volumes storing data requested by the host computers to be written, comprising:

a memory storing a plurality of copy pair definition information from each of the host computers, the copy pair definition information indicating associations between primary volumes and secondary volumes forming copy pairs; and a processor configured to obtain the plurality of copy pair definition information stored in each of the plurality of host computers, wherein the primary volumes are a part of volumes from which data is copied, and the secondary volumes are a part of volumes to which data is copied, wherein the processor is further configured to:

(A) obtain the plurality of copy pair definition information stored in each of the plurality of host computers, indicating associations between the primary volumes and the secondary volumes;

(B) remove at least one duplicate copy pair definition information from the copy pair definition information obtained from the plurality of host by executing to:

(B1) pick up a certain copy pair definition information from the plurality of copy pair definition information obtained from the plurality of host computers, register the certain copy pair definition information in an information obtaining definition table and delete the certain copy pair definition information from the plurality of copy pair definition information obtained from the plurality of host computers;

(B2) remove a copy pair definition information which duplicates the certain copy definition information from the plurality of copy pair definition information obtained from the plurality of host computers; and (B3) repeat steps (B1) and (B2) until no copy pair definition information is left in the plurality of copy pair definition information obtained from the plurality of host computers; and (C) for each of the copy pairs, acquire a host computer requested by the management computer from the plurality of host computers, wherein the requested host computer collects copy pair status of a corresponding copy pair based on the copy pair definition information obtained from the plurality of host computers registered in the information obtaining definition table, to avoid obtaining copy pair status of the same copy pair more than once, and (D) request to collect copy pair statuses of the copy pairs from the at least one storage subsystem to the requested host computer based on obtaining copy pair definition information from which the duplicate copy pair definition information has been removed.

26. The storage system according to claim 24, wherein the host computers each include at least one application program, and wherein the management computer is a separate computer from the host computers and is dedicated to management operations utilizing a management program, and further wherein the management computer does not include any application programs.

27. The management computer according to claim 25, wherein the host computers each include at least one application program, and wherein the management computer is a separate computer from the host computers and is dedicated to management operations utilizing a management program, and further wherein the management computer does not include any application programs.

* * * * *